US010923121B2

(12) United States Patent
Locascio et al.

(10) Patent No.: US 10,923,121 B2
(45) Date of Patent: Feb. 16, 2021

(54) METHOD, APPARATUS, AND COMPUTER PROGRAM PRODUCT FOR SEARCHABLE REAL-TIME TRANSCRIBED AUDIO AND VISUAL CONTENT WITHIN A GROUP-BASED COMMUNICATION SYSTEM

(71) Applicant: SLACK TECHNOLOGIES, INC., San Francisco, CA (US)

(72) Inventors: Andrew Locascio, San Francisco, CA (US); Lynsey Haynes, San Francisco, CA (US); Jahanzeb Sherwani, San Francisco, CA (US); Jason DiCioccio, Santa Clara, CA (US)

(73) Assignee: SlackTechnologies, Inc., San Francisco, CA (US)

( * ) Notice: Subject to any disclaimer, the term of this patent is extended or adjusted under 35 U.S.C. 154(b) by 0 days.

(21) Appl. No.: 16/101,130

(22) Filed: Aug. 10, 2018

(65) Prior Publication Data

US 2019/0051301 A1    Feb. 14, 2019

Related U.S. Application Data

(60) Provisional application No. 62/544,204, filed on Aug. 11, 2017.

(51) Int. Cl.
*G10L 15/26* (2006.01)
*G10L 15/22* (2006.01)
(Continued)

(52) U.S. Cl.
CPC .......... *G10L 15/22* (2013.01); *G06F 16/685* (2019.01); *G06K 9/00228* (2013.01); *G06K 9/00288* (2013.01); *G10L 15/1822* (2013.01); *G10L 15/26* (2013.01); *G10L 15/30* (2013.01); *H04L 12/1831* (2013.01); *H04L 51/066* (2013.01);
(Continued)

(58) Field of Classification Search
CPC ............ H04M 2203/2038; H04M 2203/2044; H04M 2203/2033; H04M 2203/5081; H04M 3/56; H04M 3/561; H04M 3/562; H04M 3/563; H04M 3/564; H04M 3/565; H04M 3/566; H04M 3/567; H04M 3/568; H04M 3/569; H04N 7/15; H04N 7/152; H04N 7/155

See application file for complete search history.

(56) References Cited

U.S. PATENT DOCUMENTS 6,424,946 B1 * 7/2002 Tritschler ............. G06K 9/6226
704/272
7,149,687 B1 * 12/2006 Gorin ..................... G10L 15/063
704/243

(Continued)

OTHER PUBLICATIONS

U.S. Appl. No. 62/703,079, filed Jul. 25, 2018, In re: Bourassa et al. entitled Reducing Transmissions by Suggesting Digital Content for Display in a Group-Based Communication Interface, U.S. Appl. No. 62/703,079.

(Continued)

*Primary Examiner* — Richard Z Zhu
(74) *Attorney, Agent, or Firm* — Morrison & Foerster LLP

(57) ABSTRACT

Embodiments of the present disclosure provide methods, systems, apparatuses, and computer program products for generating a searchable transcript of a group-based audio/video connection within a group-based communication system.

25 Claims, 16 Drawing Sheets

(51) Int. Cl.
| | |
|---|---|
| *G10L 15/18* | (2013.01) |
| *G06K 9/00* | (2006.01) |
| *G10L 15/30* | (2013.01) |
| *H04L 12/18* | (2006.01) |
| *H04L 12/58* | (2006.01) |
| *G06F 16/683* | (2019.01) |
| *H04N 7/15* | (2006.01) |

(52) U.S. Cl.
CPC ..... *H04L 12/1822* (2013.01); *H04M 2203/50* (2013.01); *H04N 7/15* (2013.01)

(56) References Cited

U.S. PATENT DOCUMENTS

| | | | | |
|---|---|---|---|---|
| 7,412,392 | B1* | 8/2008 | Satapathy | H04L 12/1831 370/260 |
| 7,466,334 | B1* | 12/2008 | Baba | G11B 27/034 348/14.06 |
| 8,412,523 | B2* | 4/2013 | Beach | H04L 67/1027 704/235 |
| 8,532,994 | B2* | 9/2013 | Malegaonkar | G10L 15/07 704/257 |
| 9,064,494 | B2* | 6/2015 | Holtel | G10L 15/22 |
| 10,121,474 | B2* | 11/2018 | Yu | G06F 3/04842 |
| 2001/0031044 | A1* | 10/2001 | Katz | G06Q 20/208 379/93.12 |
| 2007/0208567 | A1* | 9/2007 | Amento | G10L 15/22 704/270 |
| 2008/0088698 | A1* | 4/2008 | Patel | H04N 7/15 348/14.09 |
| 2009/0326939 | A1* | 12/2009 | Toner | H04M 1/656 704/235 |
| 2011/0150198 | A1* | 6/2011 | Walsh | H04M 3/56 379/202.01 |
| 2012/0143605 | A1* | 6/2012 | Thorsen | G10L 15/183 704/235 |
| 2012/0330976 | A1* | 12/2012 | Tsuchida | G06F 17/2276 707/749 |
| 2013/0054241 | A1* | 2/2013 | Goldberg | G06Q 10/10 704/235 |
| 2013/0058471 | A1* | 3/2013 | Garcia | H04M 3/42221 379/202.01 |
| 2015/0120825 | A1* | 4/2015 | Waxman | H04L 67/36 709/204 |
| 2016/0275952 | A1* | 9/2016 | Kashtan | G10L 17/00 |
| 2018/0048751 | A1* | 2/2018 | Crowell | H04M 1/656 |
| 2018/0097856 | A1* | 4/2018 | Dange | H04L 67/10 |
| 2018/0287982 | A1 | 10/2018 | Draeger et al. | |

OTHER PUBLICATIONS

U.S. Appl. No. 16/010,891, filed Jun. 18, 2018, In re: Wills et al. entitled Method, Apparatus and Computer Program Product for Metadata Search in a Group-Based Communication Platform, U.S. Appl. No. 16/010,891.
U.S. Appl. No. 15/844,094, filed Dec. 15, 2017, In re: Liszka et al. entitled Method, Apparatus and Computer Program Product for Improving Data Indexing in a Group-Based Communication Platform, U.S. Appl. No. 15/844,094.
U.S. Appl. No. 15/651,887, filed Jul. 17, 2017, In re: Grant et al. entitled Messaging Search and Management Apparatuses, Methods and Systems, U.S. Appl. No. 15/651,887.
U.S. Appl No. 15/604,589, filed May 24, 2017, In re: Grant et al. entitled Messaging Search and Management Apparatuses, Methods and Systems, U.S. Appl. No. 15/604,589.
U.S. Appl. No. 15/604,584, filed May 24, 2017, In re: Grant et al. entitled Messaging Search and Management Apparatuses, Methods and Systems, U.S. Appl. No. 15/604,584.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.
Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.
Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 2 pages.
Michael Carney, "Slack is thriving on a cocktail of whimsy and great timing", Pandodaily, Lexisnexis, https://advance.lexis.com/api/permalink/dd2d4ee5-2ddf-4d3a-ald9-3bcee5e38b74/?context=1000516, (dated Feb. 6, 2015, 2:12 AM) 3 pages.
Matthew Ingram, "Flickr co-founder launches Slack, an all-in-one messaging tool designed to kill email forever", GIGAOM, Lexisnexis, https://advance.lexis.com/api/permalink/0b676b7c-aec3-4560-861e-d030d1dd008c/?context=1000516, (dated Feb. 12, 2014, 7:03 PM), 2 pages.
Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 4 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.
Ernie Smith, "Picking Up the Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.
David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-buttertield-flickr-and-slack-how-he-snatched-victory-from-the-jaws-of-defeat.html>. (dated May 28, 2014, 2:48 PM) 8 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.
"Die, Email, Diet a Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.
Matsumoto, T. et al., "Chocoa Communicator—A New Communication System Based on Awareness and Text Communications—", Fujitsu Sci. Tech. J., 36, 2, (Dec. 2000) 154-161.

* cited by examiner

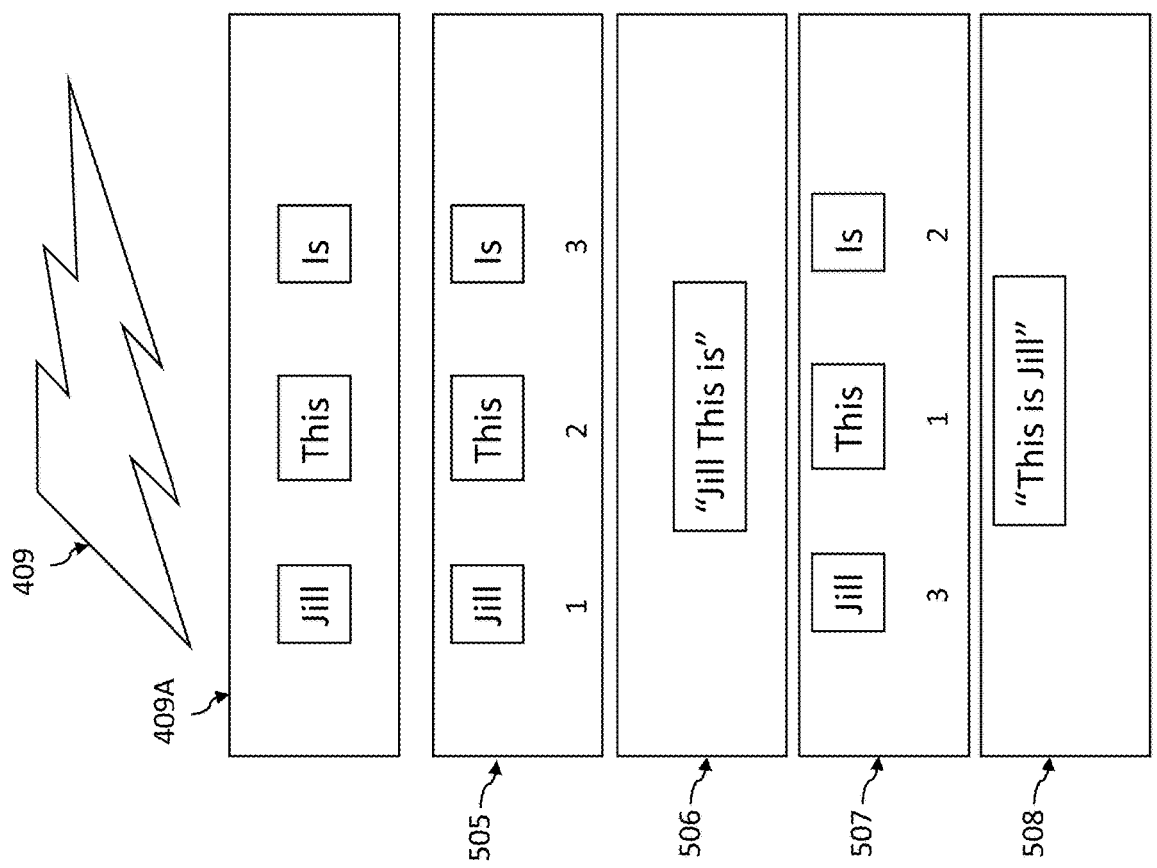

METHOD, APPARATUS, AND COMPUTER PROGRAM PRODUCT FOR SEARCHABLE REAL-TIME TRANSCRIBED AUDIO AND VISUAL CONTENT WITHIN A GROUP-BASED COMMUNICATION SYSTEM

CROSS-REFERENCE TO RELATED APPLICATIONS

The present application claims priority to U.S. Provisional Application Ser. No. 62/544,204, titled "METHOD, APPARATUS, AND COMPUTER PROGRAM PRODUCT FOR SEARCHABLE REAL-TIME TRANSCRIBED AUDIO AND VISUAL CONTENT WITHIN A GROUP-BASED COMMUNICATION SYSTEM," filed Aug. 11, 2017, the contents of which are incorporated herein by reference in their entirety.

BACKGROUND

An enterprise or organization may provide for collaboration among client devices, including via messaging, audio calls, and video conference calls. Applicant has identified a number of deficiencies and problems associated with accessing content presented in audio and video conferences calls, especially in the context of a group-based communication system. Through applied effort, ingenuity, and innovation, many of these identified problems have been solved by developing solutions that are included in embodiments of the present disclosure, many examples of which are described in detail herein.

BRIEF SUMMARY

This specification relates to methods, systems, apparatuses, and computer program products for generating a searchable transcript of a group-based audio feed within a group-based communication system. In one embodiment, an apparatus is configured to receive a group-based audio feed comprised of a plurality of sub-feeds, each sub-feed received from a respective client device, and each sub-feed comprising a plurality of sequential audio snippets; for each sub-feed received from a client device, for each sequential audio snippet, using a speech recognition engine, convert the sequential audio snippet to a final assembled text string; assign a connection sequence number to the final assembled text string; assign a group-based communication channel identifier, a user identifier, and a group-based audio feed identifier to the final assembled text string, wherein the user identifier is associated with the group-based communication channel identifier; transmit to each of the respective client devices, a group-based communication channel interface comprising the final assembled text strings arranged according to their respective connection sequence number into a searchable transcript; and store the searchable transcript in a group-based communication repository, wherein the searchable transcript is indexed for searching within the group-based communication system.

The apparatus is optionally additionally configured to transmit to each of the respective client devices a group-based communication channel interface comprising the temporary assembled text strings in a temporary format; and upon assembly of the final assembled text strings, transmit to each of the respective client devices a group-based communication channel interface comprising the final assembled text strings in a final format.

The apparatus is optionally additionally configured to for each final assembled text string, parse the final assembled text string to identify an informality; and remove the informality from the final assembled text string.

The apparatus is optionally additionally configured to determine, using voice recognition, the user identifier associated with the sub-feed.

The apparatus is optionally additionally configured to determine, based on a client device associated with the sub-feed, the user identifier associated with the sub-feed.

The apparatus is optionally additionally configured to receive a video signal associated with the group-based audio feed; and determine, using facial recognition, the user identifier associated with the sub-feed.

The apparatus is optionally additionally configured to receive an audio signal and a video signal associated with the group-based audio feed; and determine, using voice recognition and facial recognition, the user associated with the sub-feed and the video signal.

The apparatus is optionally additionally configured to identify the informality by comparing the parsed final assembled text string to a spoken informality store. In some embodiments, the spoken informality store is generated based on a machine learning model.

The apparatus is optionally additionally configured to determine, using the speech recognition engine, that the sequential audio snippet does not include speech.

The apparatus is optionally configured to detect a spoken name within the group-based audio feed, the spoken name associated with a notification request, and transmit a notification to a client device associated with a user identifier in the notification request that the spoken name detection occurred.

The apparatus is optionally configured to receive a search query from a client device. The apparatus is optionally configured to retrieve from the group-based communication repository, search results comprising a plurality of searchable transcripts based on parameters extracted from the search query. The apparatus is optionally configured to return the search results to the client device.

The apparatus is optionally configured to detect a topic with the group-based audio feed, the topic associated with a notification request, and transmit a notification to a client device associated with a user identifier in the notification request that the topic detection occurred.

Other embodiments include corresponding systems, methods, and computer programs, configured to perform the operations of the apparatus, encoded on computer storage devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
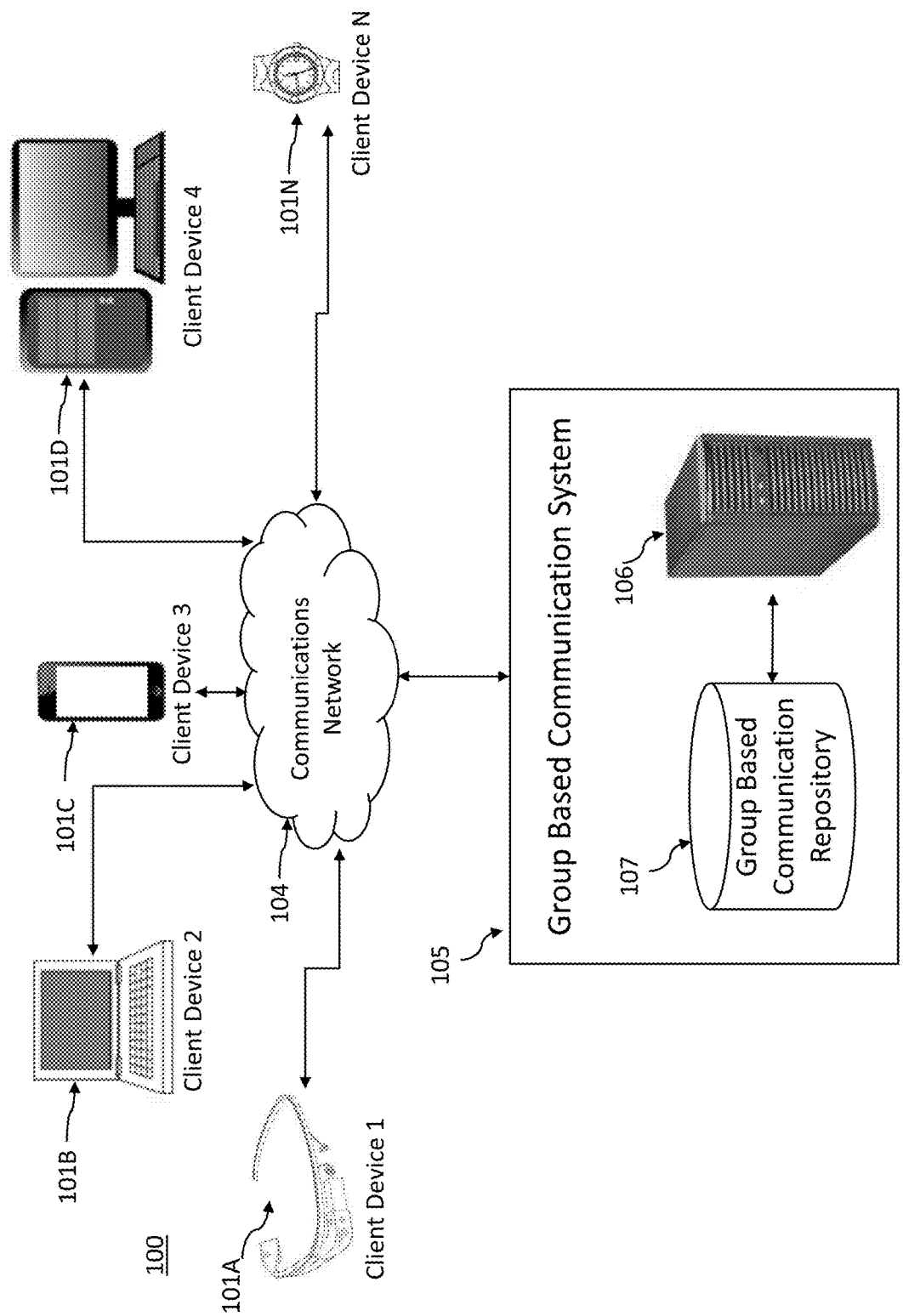
Figure 2:
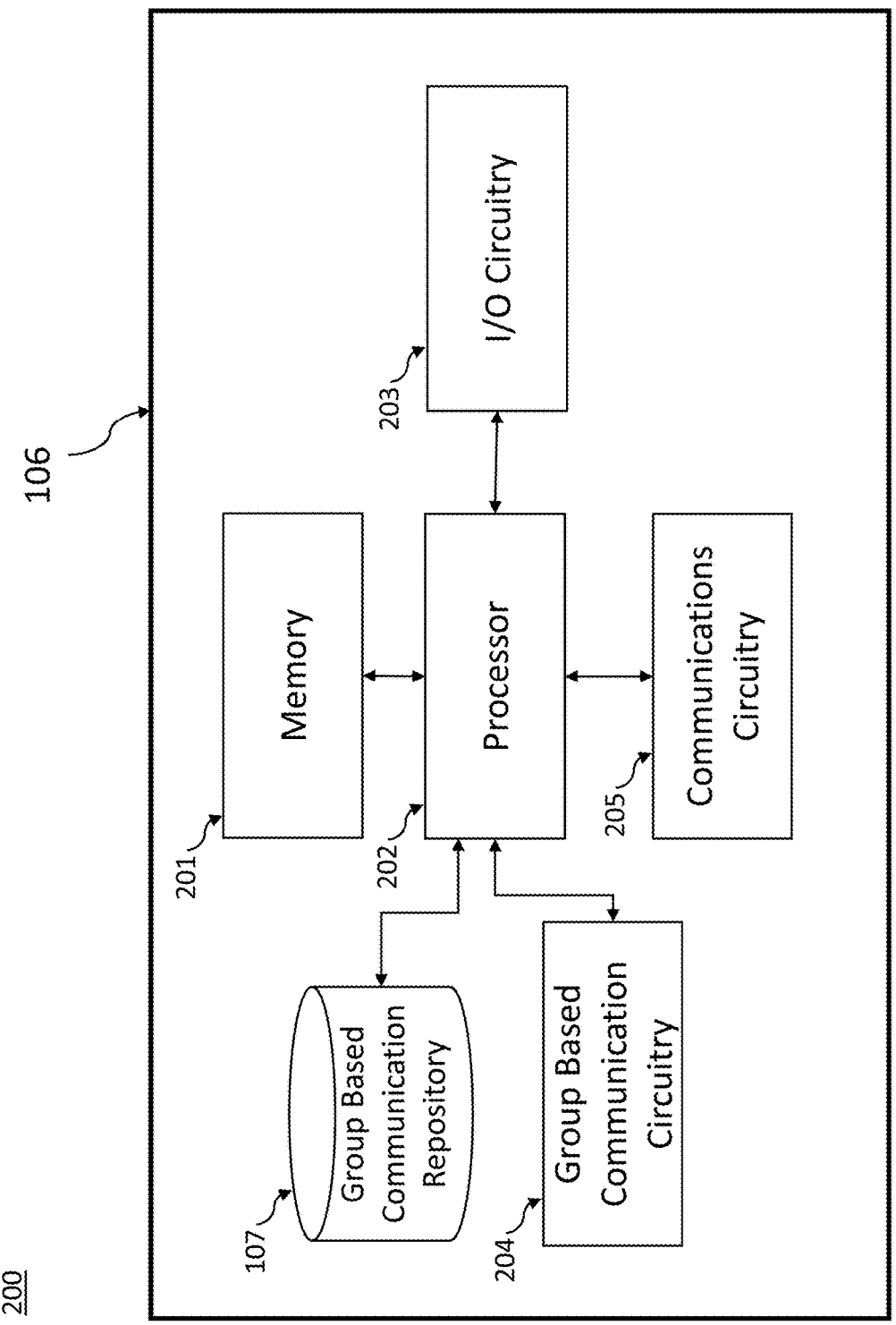
Figure 3A:
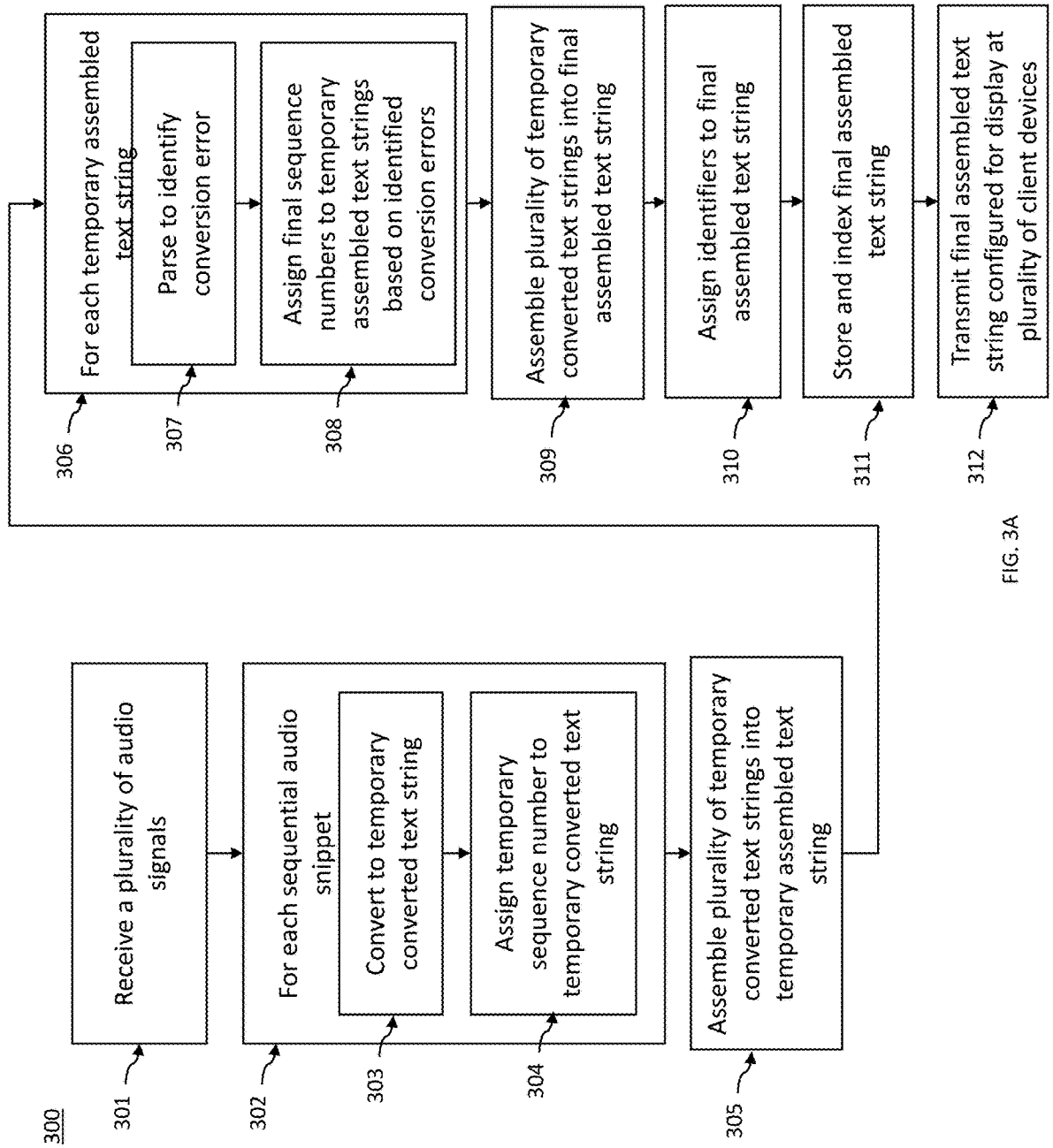
Figure 3B:
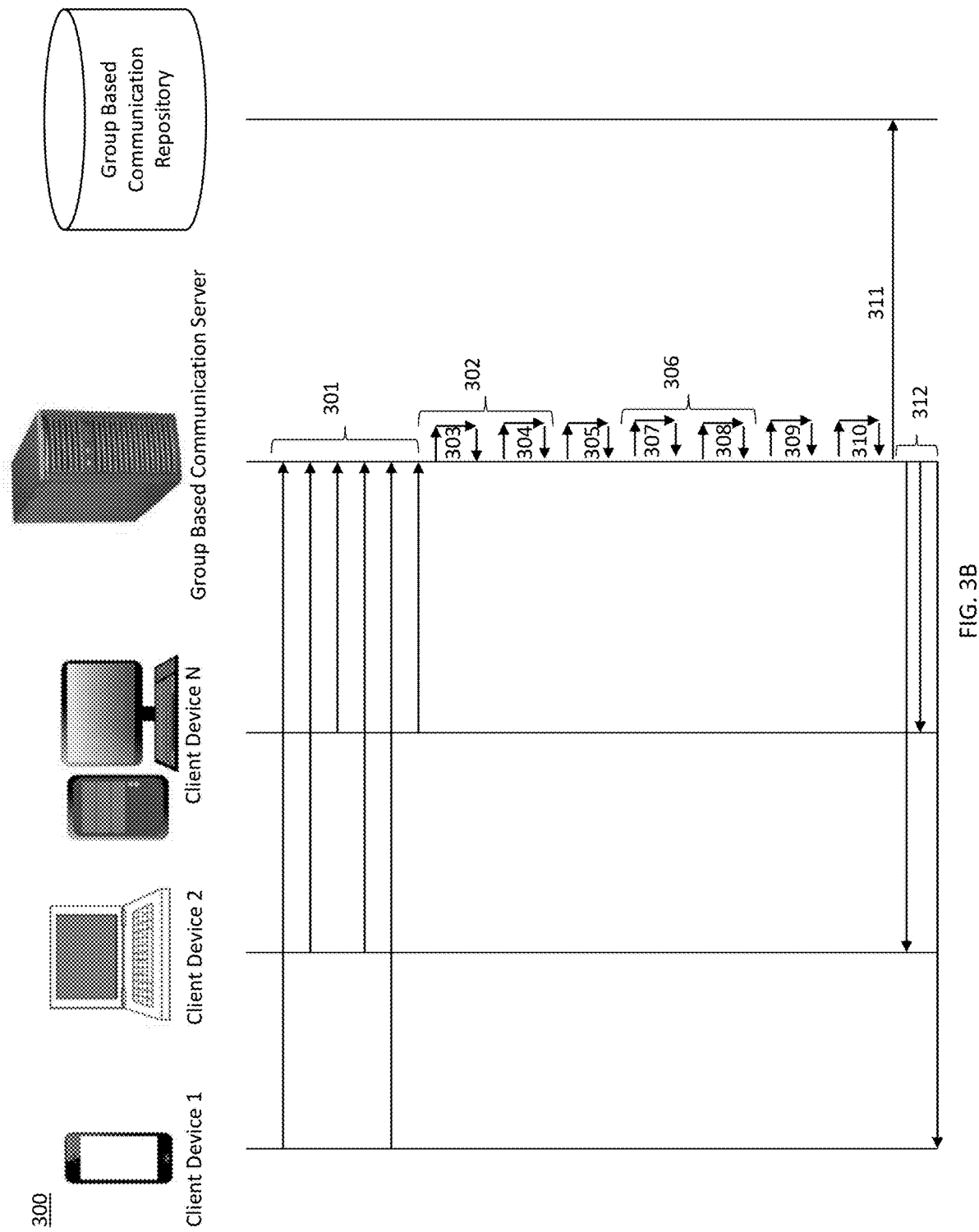
Figure 3C:
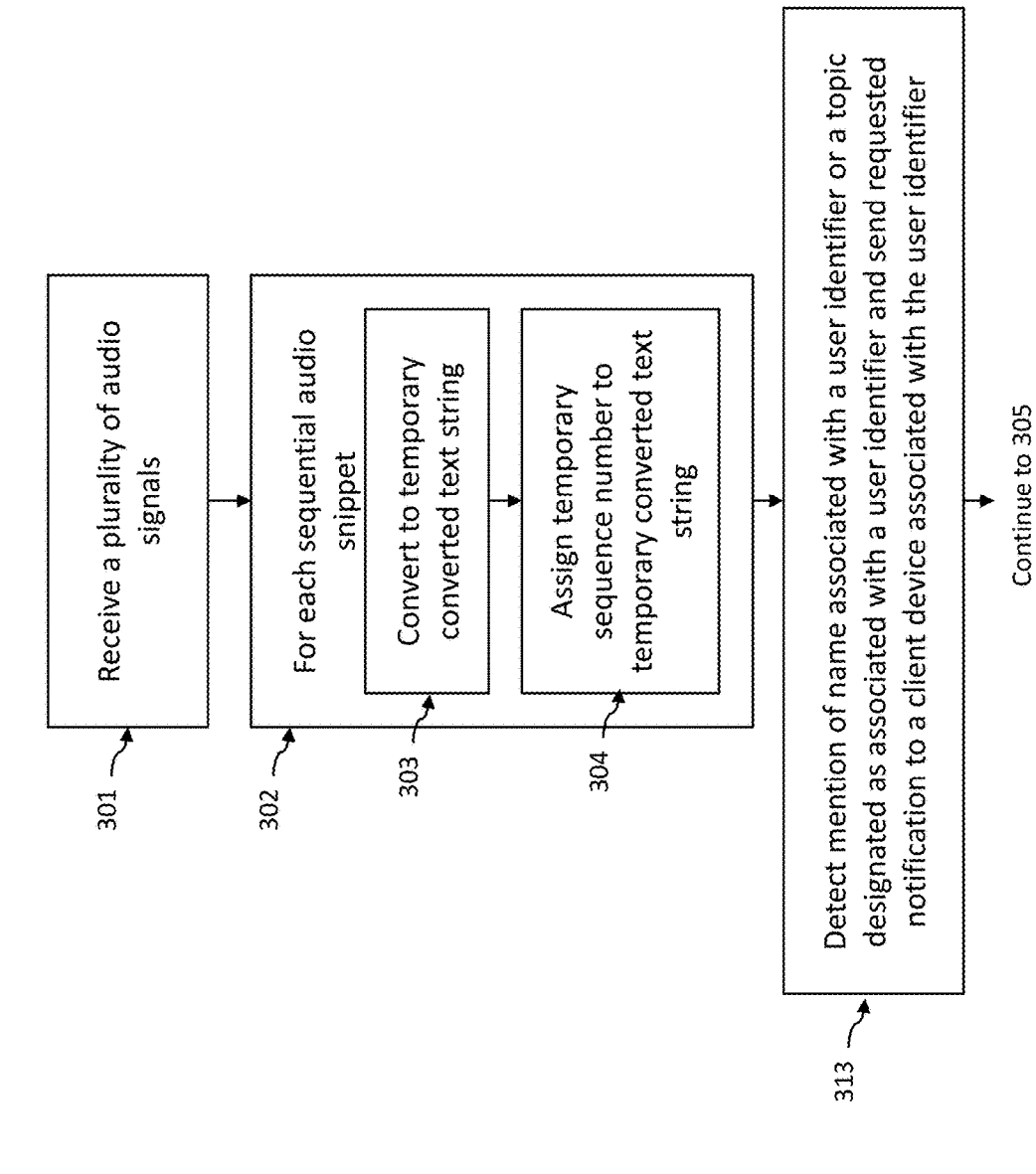
Figure 3D:
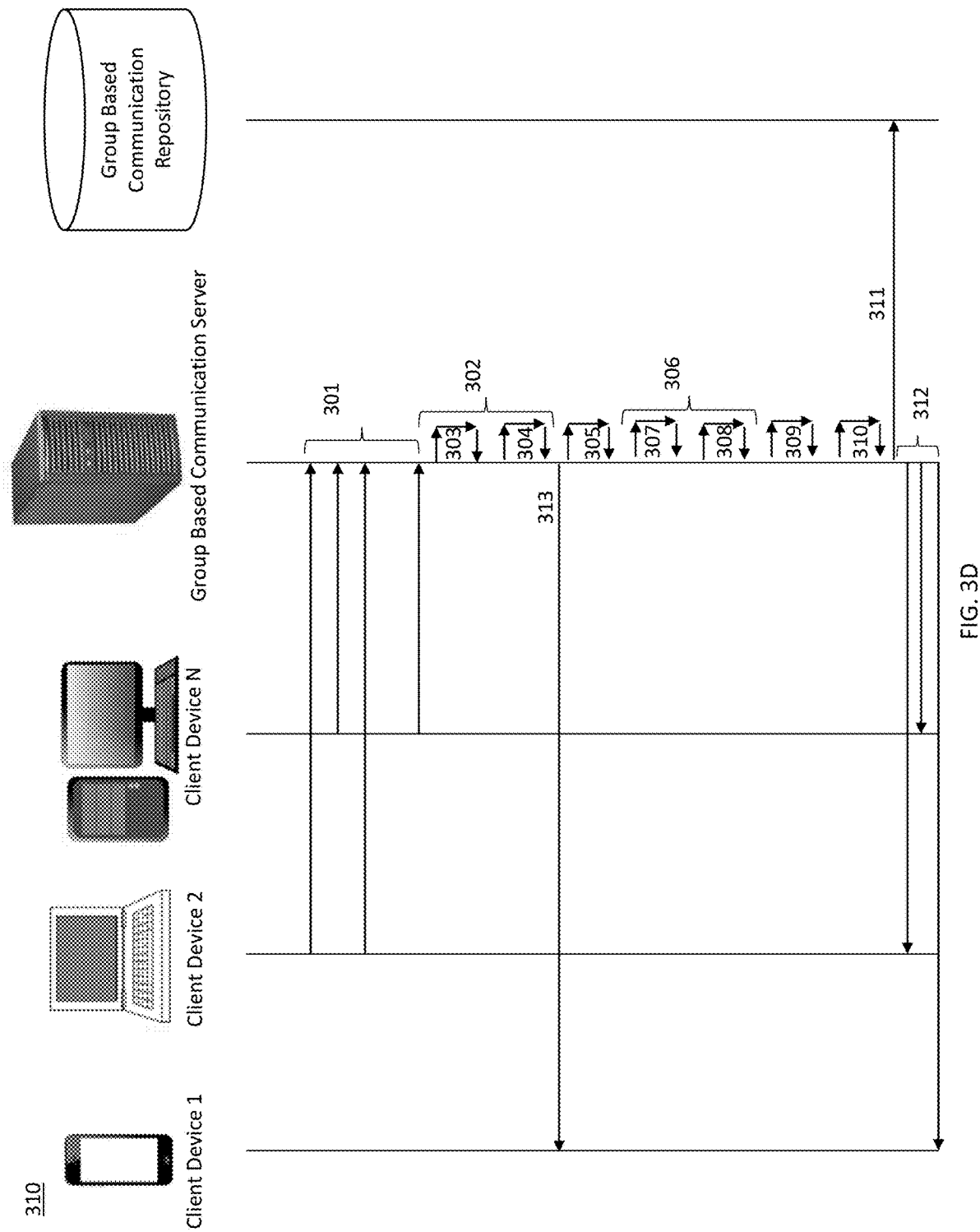
Figure 4A:
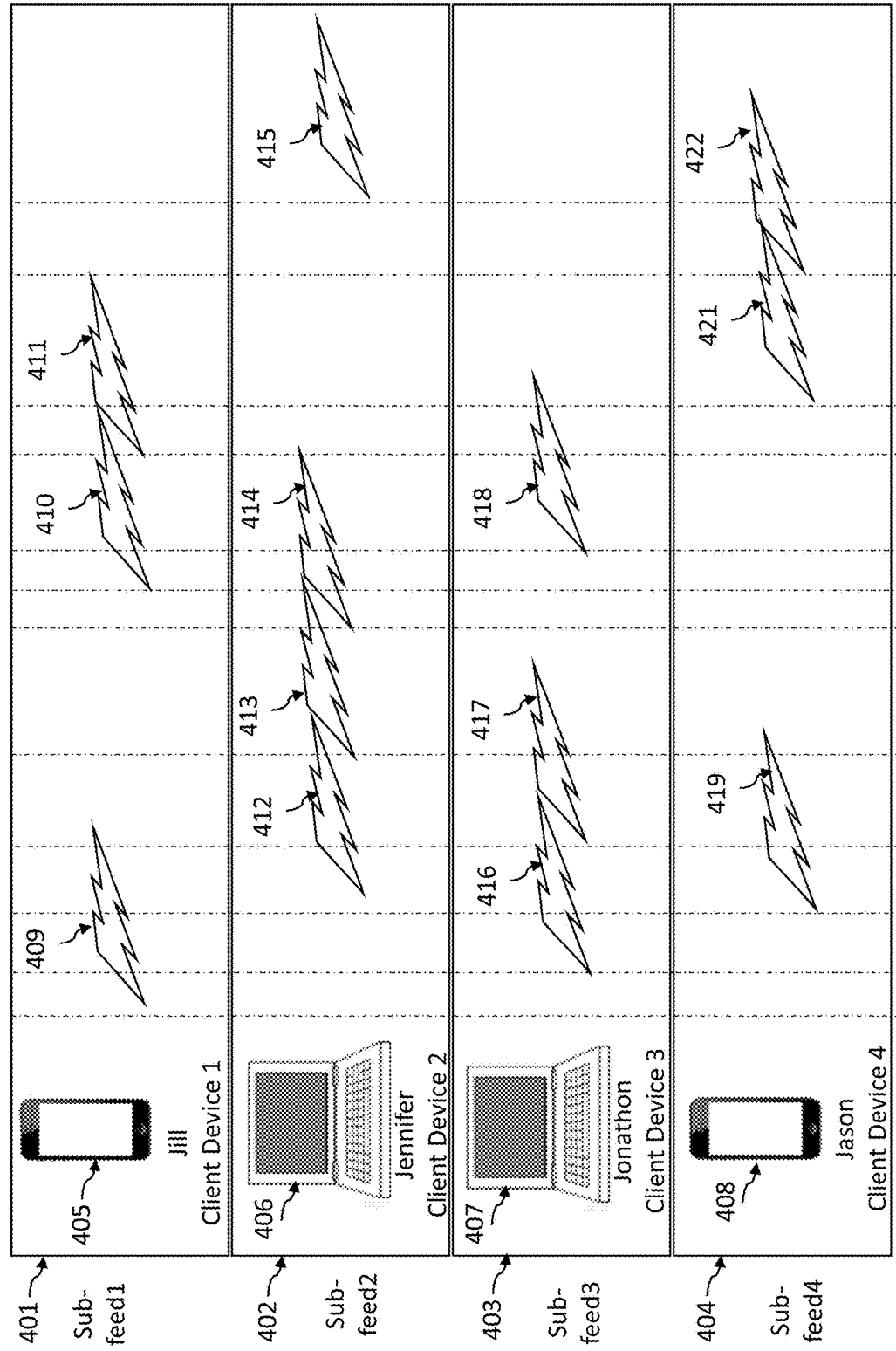
Figure 4B:
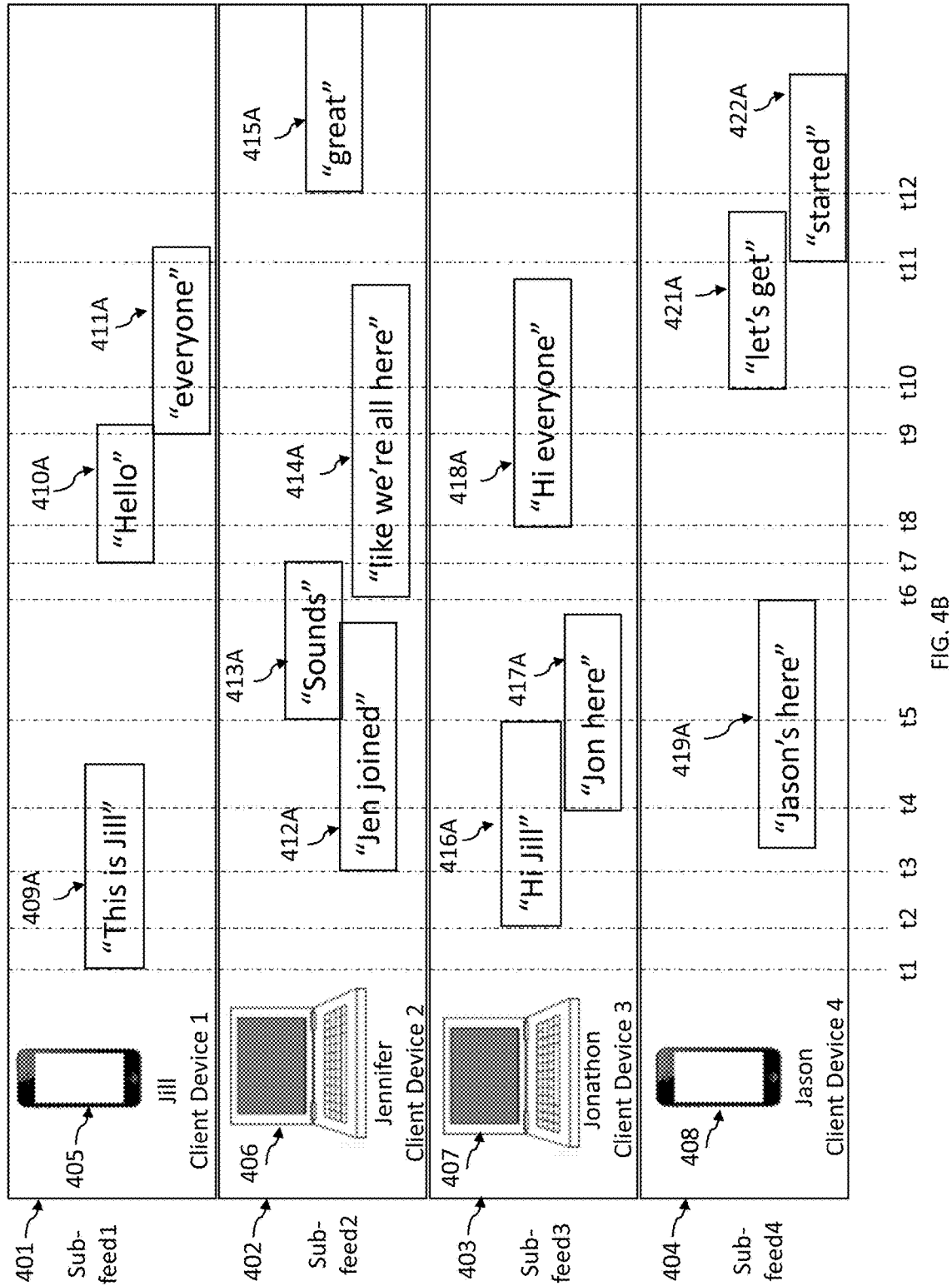
Figure 6:
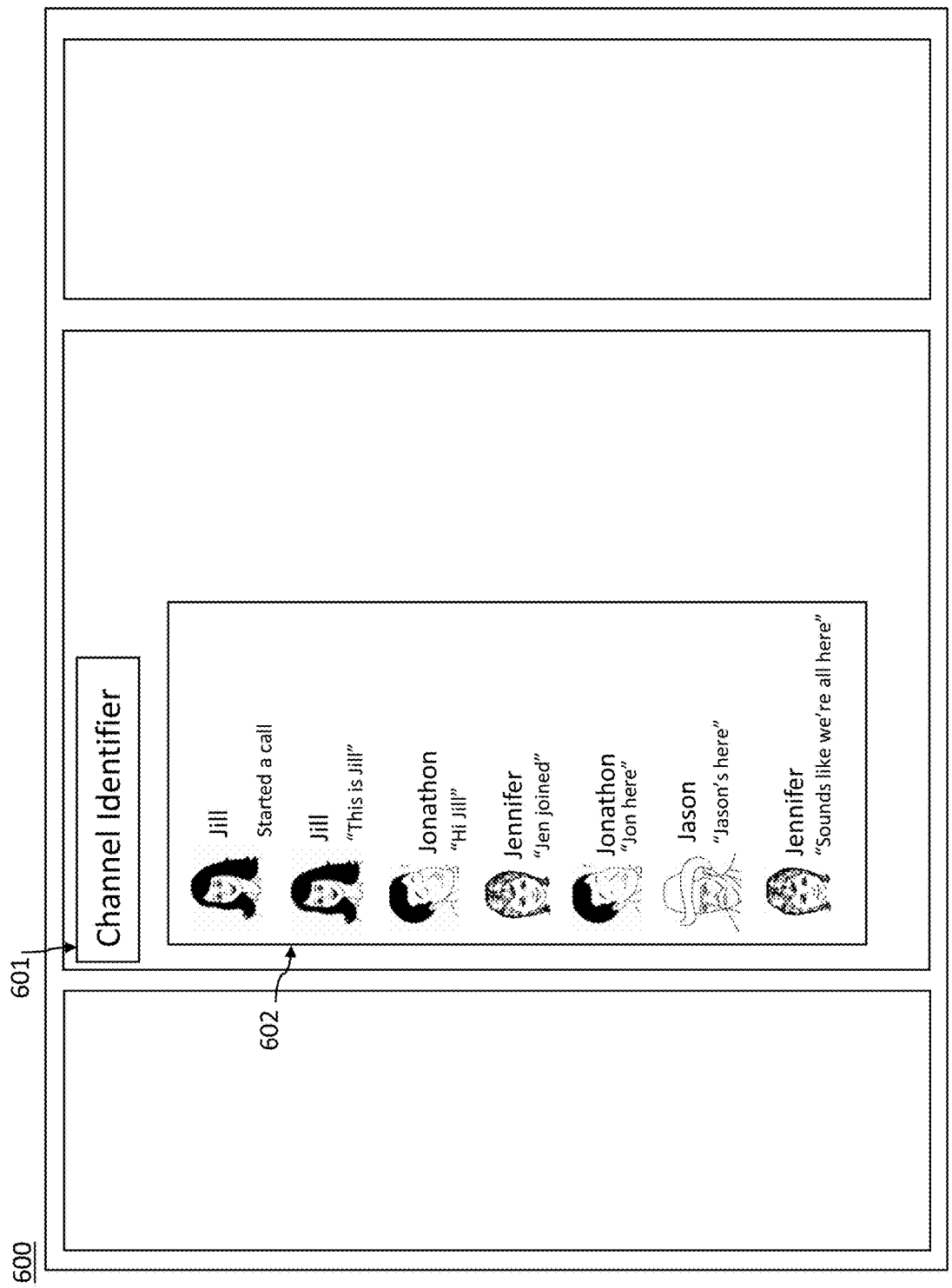
Figure 7:
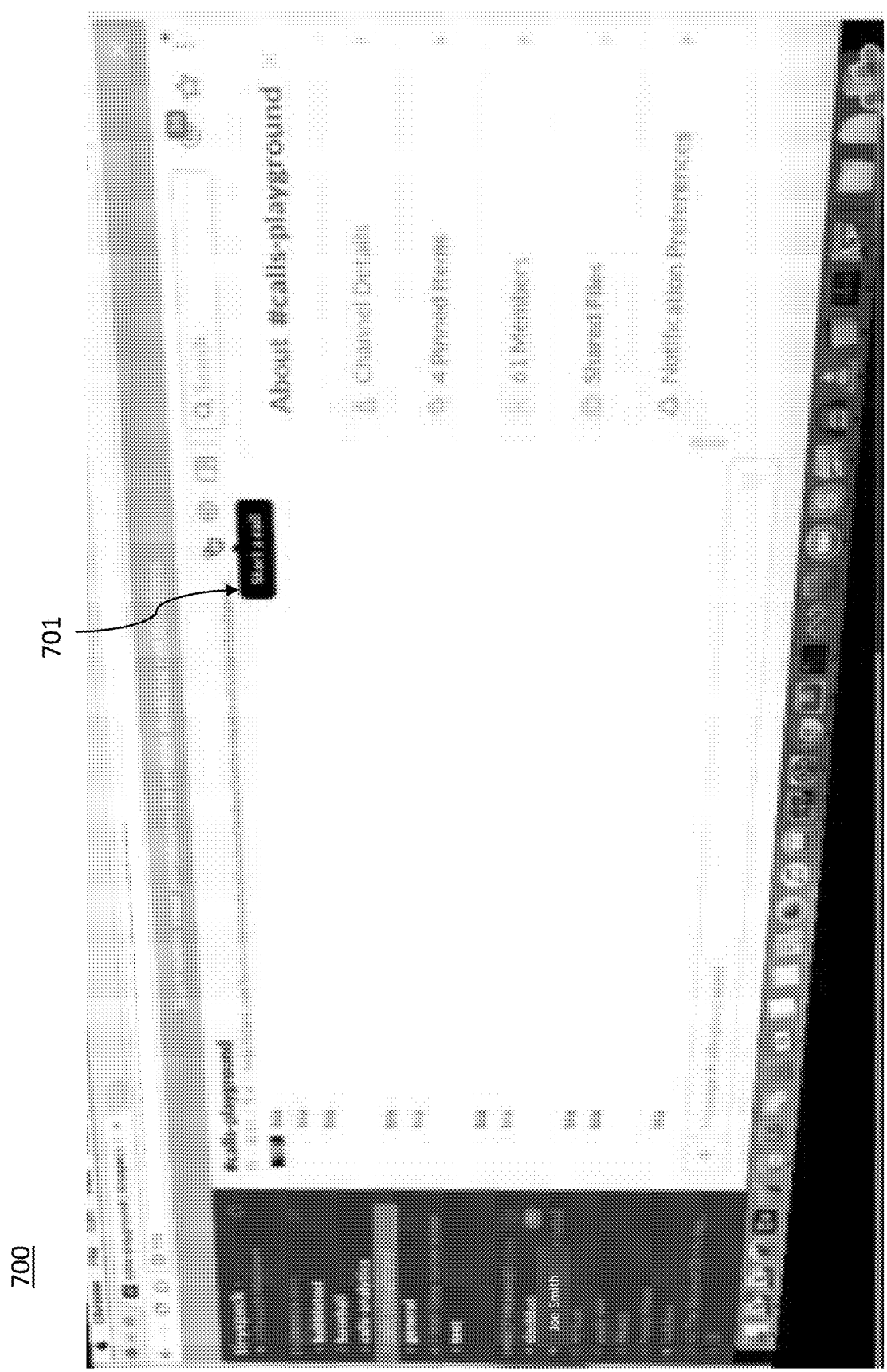
Figure 8:
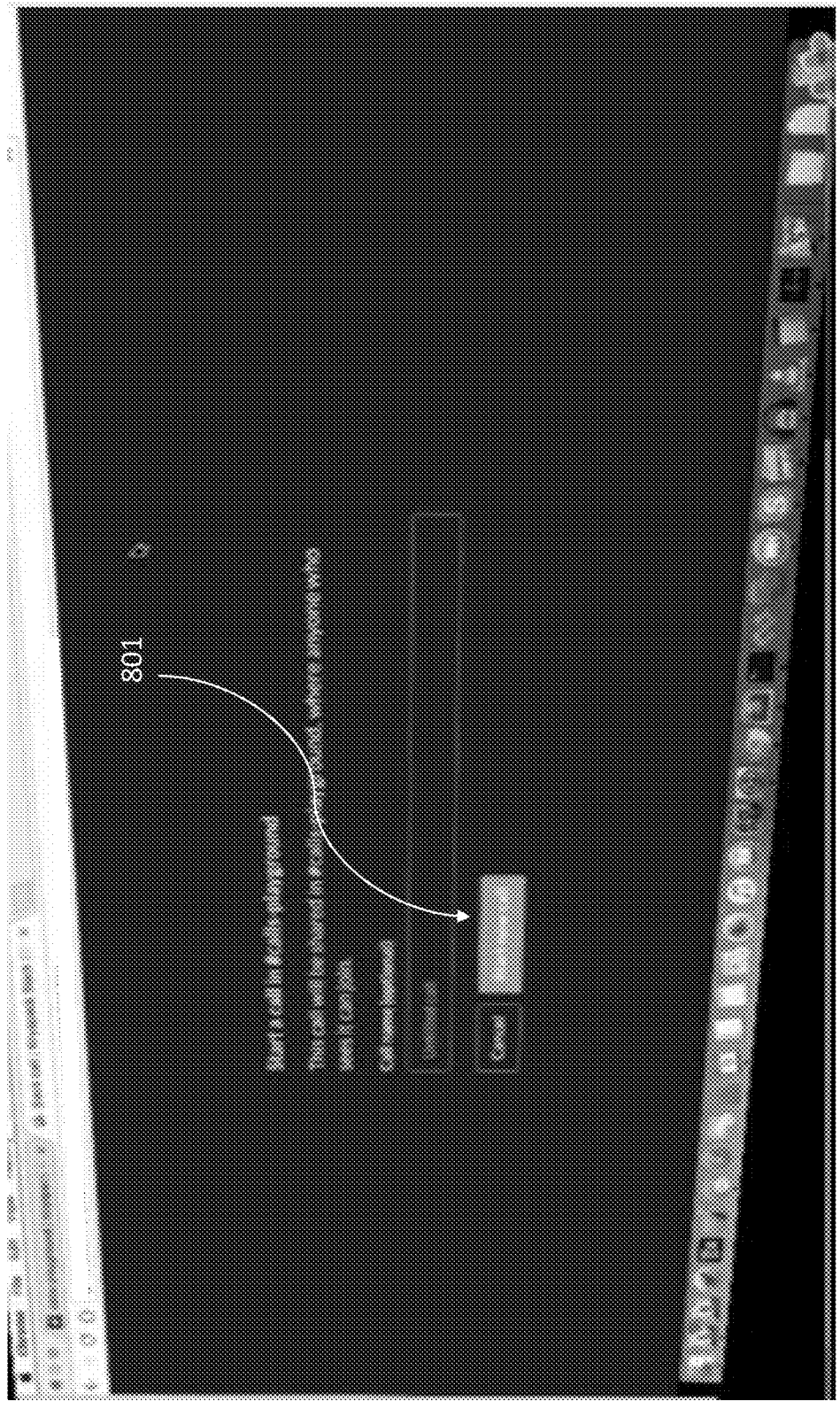
Figure 9:
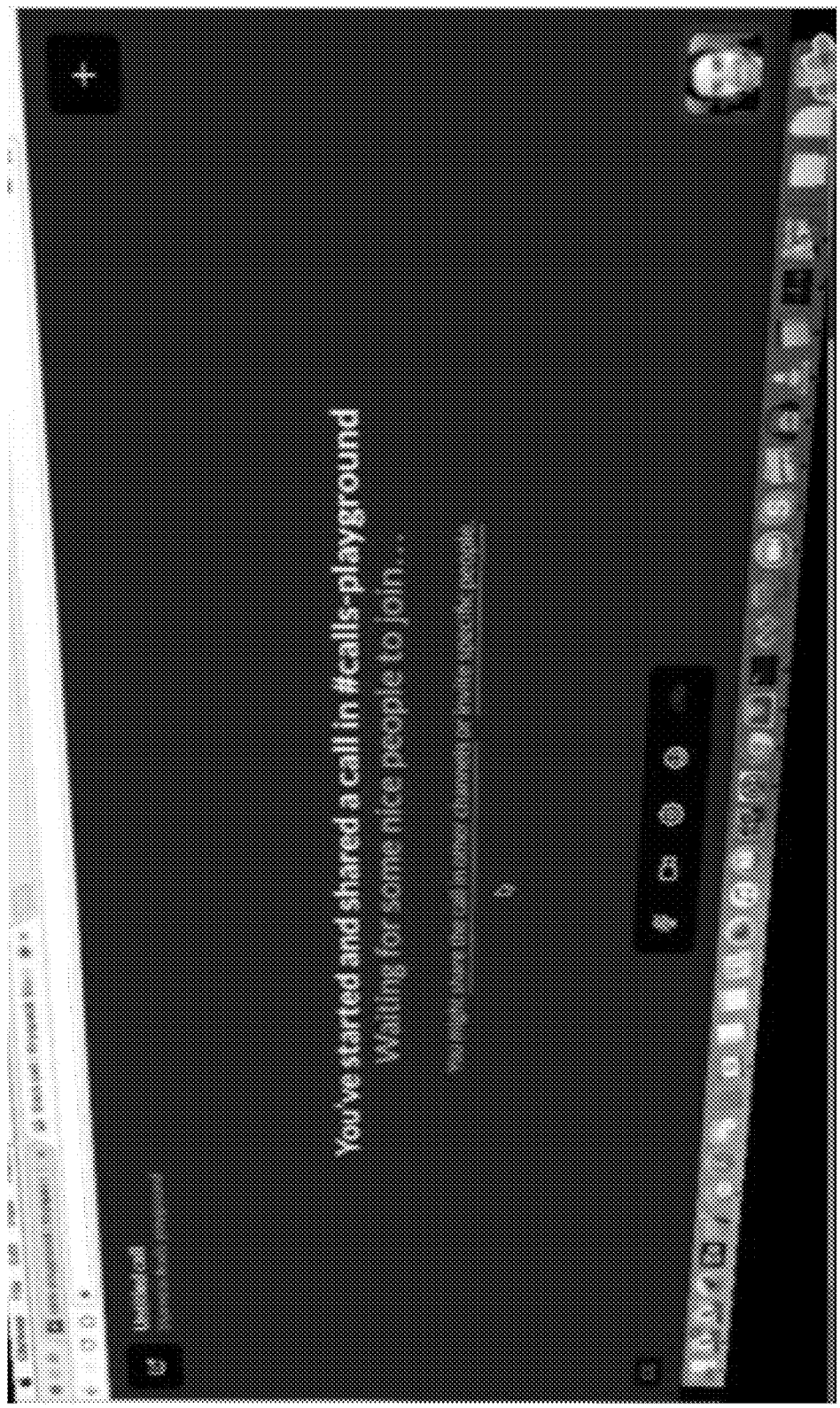
Figure 10:
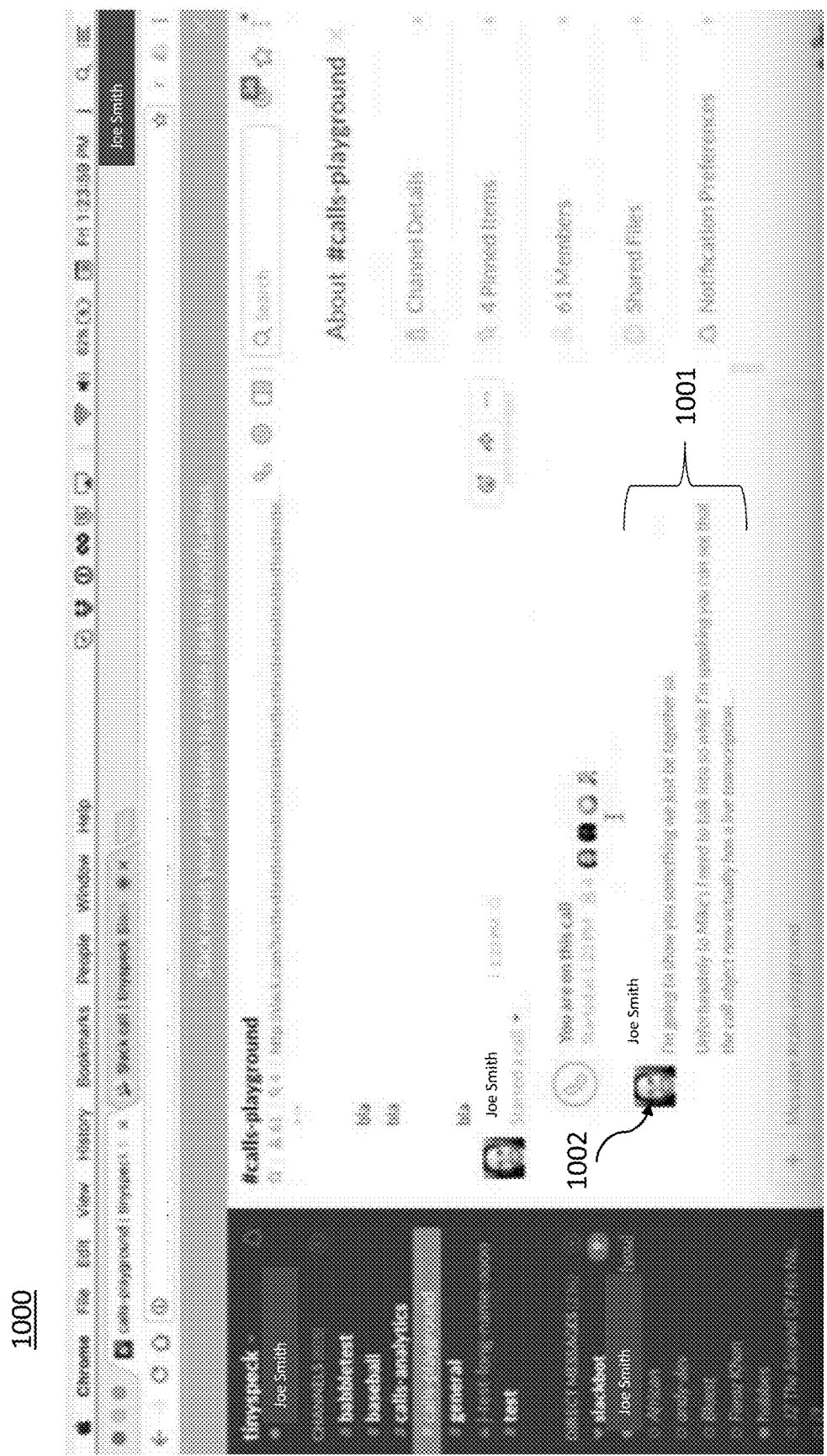
Figure 11:
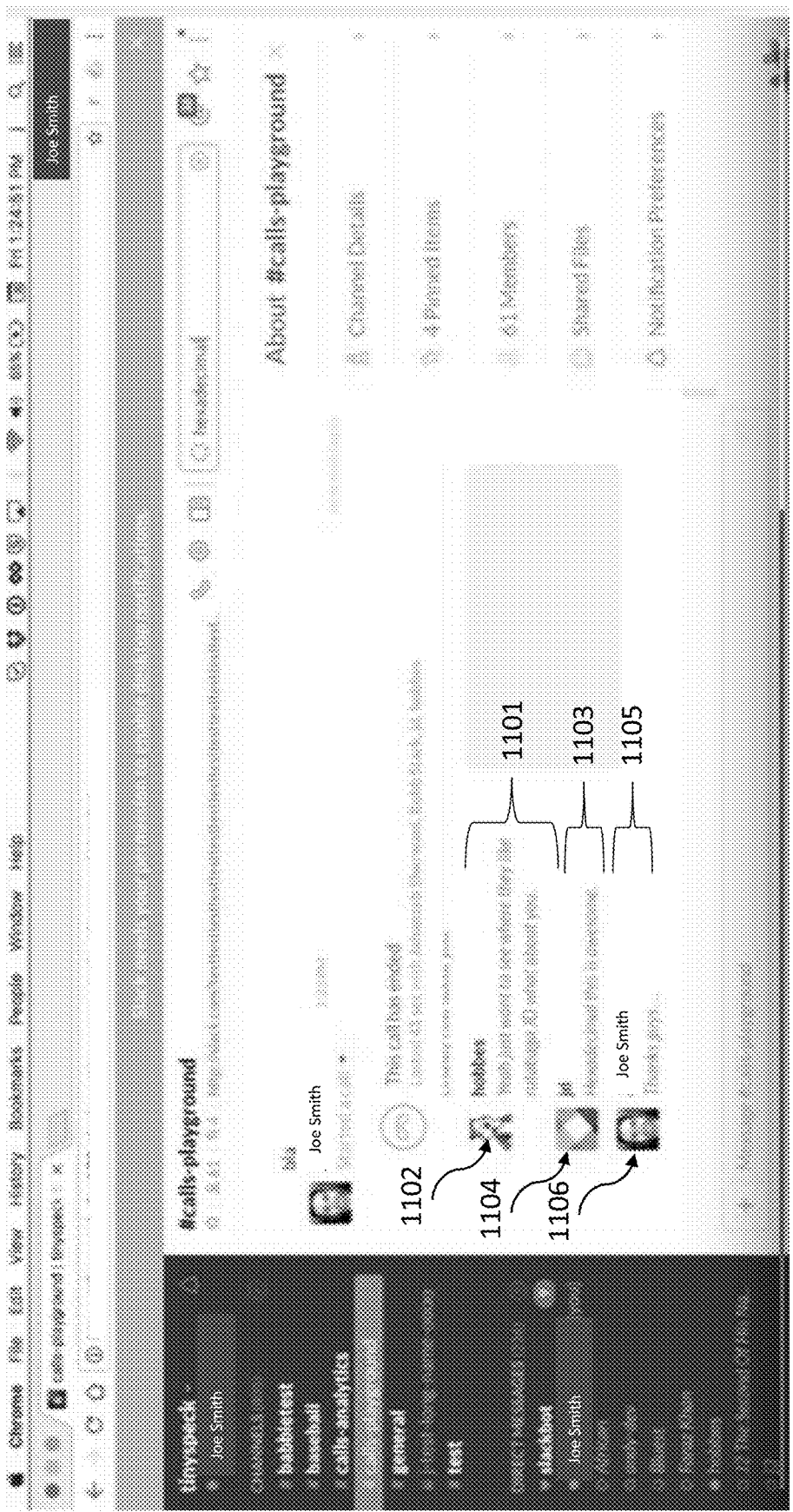
Figure 12:
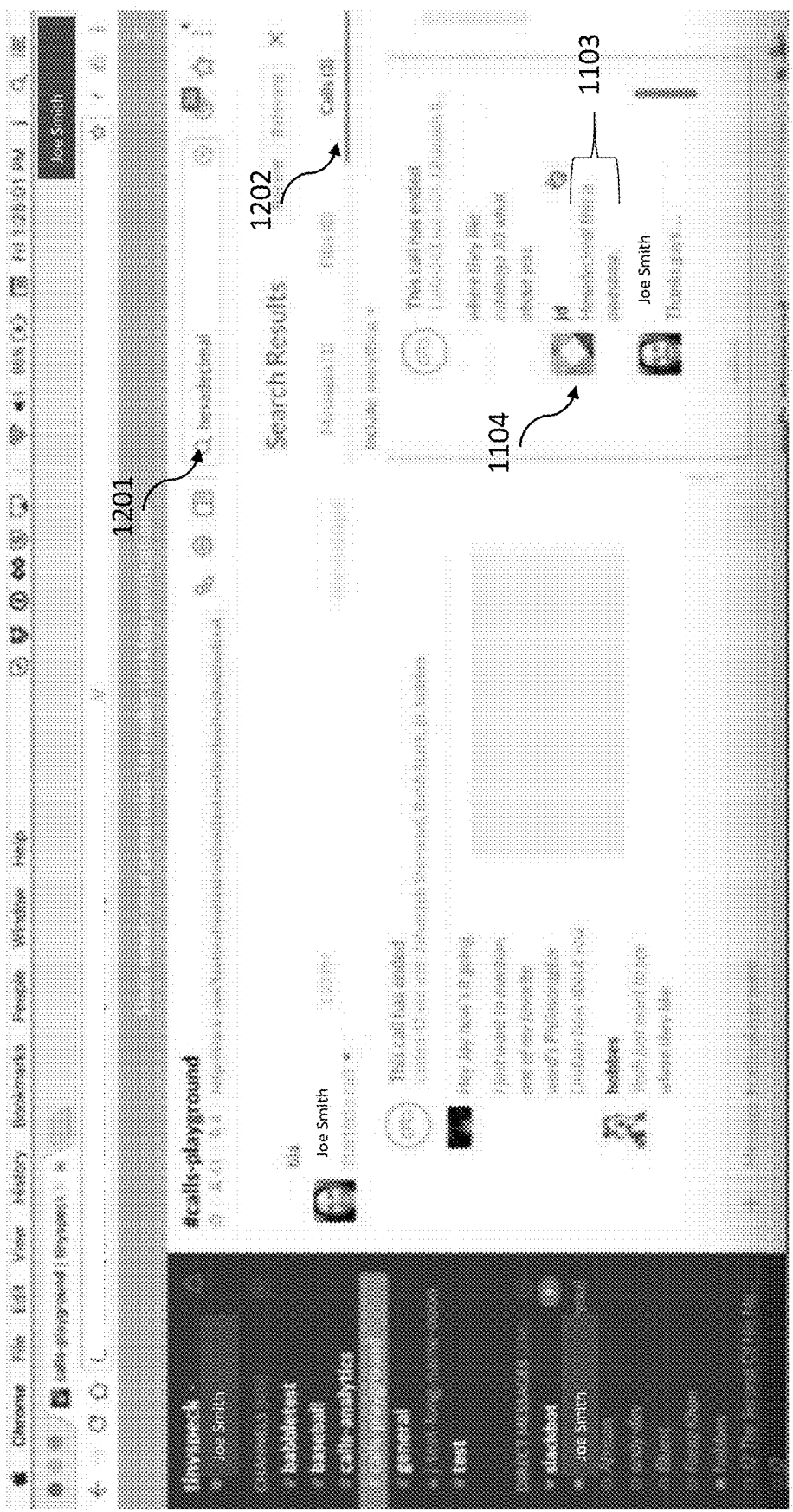

Having thus described the disclosure in general terms, reference will now be made to the accompanying drawings, which are not necessarily drawn to scale, and wherein:

FIG. 1 is a system architecture diagram of an exemplary group-based communication system configured to practice embodiments of the present disclosure;

FIG. 2 is an exemplary schematic diagram of a computing entity according to one embodiment of the present disclosure;

FIGS. 3A and 3B illustrate an exemplary searchable transcript generation process according to one embodiment of the present disclosure;

FIGS. 3C and 3D illustrate an exemplary searchable transcript generation method according to one embodiment of the present disclosure;

FIG. 4A illustrates an exemplary group-based audio feed according to one embodiment of the present disclosure;

FIG. 4B illustrates an exemplary group-based audio feed according to one embodiment of the present disclosure;

FIG. 5 illustrates exemplary assigning of sequence numbers according to one embodiment of the present disclosure;

FIG. 6 illustrates an exemplary group-based audio feed in an exemplary group-based audio interface according to one embodiment of the present disclosure;

FIG. 7 illustrates an exemplary group-based audio interface according to one embodiment of the present disclosure;

FIG. 8 illustrates an exemplary group-based audio interface according to one embodiment of the present disclosure;

FIG. 9 illustrates an exemplary group-based audio interface according to one embodiment of the present disclosure;

FIG. 10 illustrates an exemplary group-based audio interface according to one embodiment of the present disclosure;

FIG. 11 illustrates an exemplary group-based audio interface according to one embodiment of the present disclosure; and FIG. 12 illustrates an exemplary group-based audio interface according to one embodiment of the present disclosure.

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the disclosure generally relate to generating a searchable transcript of a group-based audio feed within a group-based communication system.

Members of a group-based communication system routinely use group-based audio and/or video connections, rather than in-person meetings, to collaborate. Real-time transcription of group-based audio and/or video connections while the group-based audio and/or video connections while the connection is occurring and making the transcription available via display in real-time (i.e., while the call is taking place) and computer network would prove useful yet is time consuming, resource intensive, expensive and error prone. Further, indexing the transcript for later search ability within the group-based communication system enables members to refer to content within the transcript at a later time, yet is also time consuming, resource intensive, expensive and error prone. Transcripts from group-based audio and/or video connections are typically not easily accessible due to the design of the group-based audio and/or video connections (e.g., a customer must go to the BlueJeans® website to locate the transcript). Further, transcription is typically an add-on feature provided by third-parties. The inventors have identified that the system resources and time allocated to such transcriptions and indexing within the context of a group-based communication system, and making the resulting searchable transcripts ready accessible to group-based communication system users, are more efficiently utilized through the use of group-based communication channels.

Moreover, network and computing resources are exhausted by increased participation in group-based audio and/or video connections while the connection is occurring. For example, increased network traffic and increased processing power are required in order to accommodate all participants in a group-based audio/video connection. The inventors have identified that real-time detection of names and/or topics and transmission of electronic notifications to client devices associated with user identifiers reduces the required number of participants in a group-based audio/video connection. In the novel embodiments disclosed herein, a user may elect not to join a group-based audio/video connection and instead receive notification (e.g., via DM) when a particular name and/or topic is detected as having been mentioned in the group-based audio/video connection. Such a user may elect to join the group-based audio/video connection only once such a detection occurs. These novel embodiments reduce the waste of computing resources on client devices because the client devices do not need to receive transmission of an entire group-based audio/video connection feed. These novel embodiments further reduce network traffic and server computing resources as well since the server is not required to transmit an entire feed to an additional client device.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "user" should be understood to refer to an individual, group of individuals, business, organization, and the like; the users referred to herein are accessing a group-based communication or messaging system using client devices.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

As used herein, the terms "messaging communication" and "message" refer to any electronically generated digital content object provided by a user using a client device and that is configured for display within a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key-words associated with the topic within such messages).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "searchable transcript" refers to a digital record of spoken language in a group-based audio feed within a group-based communication system. A searchable transcript may have associated with it a searchable transcript identifier, various timestamps (i.e., when each word was spoken), speaker IDs (i.e., who spoke), transcript of speech (i.e., what was said), and input type identifiers (i.e., to differentiate transcribed text from typed text, and from emoji reactions, all in the same conversation and/or communication connection).

When a group-based video and/or audio connection is initiated, a "call object" is created. A "call object" is a digital object that provides the current states of a group-based audio feed (e.g., in progress, ended, participants). The call object is expanded and the searchable transcript is included therein.

The terms "group-based audio feed" and "group-based audio/video connection" refers to a live exchange over a digital connection of information between members of a group-based communication system. In some examples, a group-based audio feed is a conference call. In other examples, the group-based audio feed is a video conference call. The digital connection can be any network connection that allows audio and/or video communications to be transmitted and received.

The term "sub-feed" refers to a portion of a group-based audio feed that is associated with a client device participating in the group-based audio feed.

The term "audio signal" refers to an electronic signal representing sound. In some examples, an audio signal comprises speech.

The term "audio capturing mechanism" refers to an electronic component for capturing sound and converting the captured sound into an electrical signal. For example, an audio capturing mechanism is a microphone.

The term "video capturing mechanism" refers to an electronic component for capturing video and converting the captured video into an electrical signal. For example, a video capturing mechanism is a video camera or a web cam.

The term "sequential audio snippet" refers to a portion of speech within an audio signal. For example, a spoken sentence may comprise multiple words or phrases arranged in sequential order. In such an example, a word or phrase of the spoken sentence can be a sequential audio snippet.

The term "speech recognition engine" refers to a computer application that recognizes speech and translates the speech into text.

The term "temporary converted text string" refers to a text string converted from a portion of an audio signal that has not yet been confirmed as accurate or free from conversion errors.

The term "temporary sequence number" refers to a position in a sequence assigned to a text string to identify where the text string should be placed in relation to other text strings of the sequence, where the sequence of text strings has not been confirmed as accurate or free from conversion errors.

The term "temporary assembled text string" refers to a sequence of temporary converted text strings that is arranged according to temporary sequence numbers, and that has not yet been confirmed as accurate or free from conversion errors.

The term "conversion error" refers to an error occurred during conversion of audio to text and/or during assembling of text strings.

The term "final sequence number" refers to a position in a sequence assigned to a text string to identify where the text string should be placed in relation to other text strings of the sequence, where the sequence of text strings has been confirmed as accurate or free from conversion errors.

The term "final assembled text string" refers to a text string converted from a portion of an audio signal that has been confirmed as accurate or free from conversion errors. A final assembled text string may have associated with it timestamps representing a start and an end of the audio signal (in some examples, each word has associated with it a timestamp). A final assembled text string may have a speaker ID associated with it (i.e., an identification of who was speaking). A final assembled text string may have associated with it alternate transcriptions along with a confidence score for each alternative. The alternate transcriptions may have highlights where there are alternatives having a confidence score exceeding a threshold. A final assembled text string may also have associated with it annotations for whether a time period is an actual word, or an informality filler (i.e., "umm") or some other type of speech that may not be shown.

The term "connection sequence number" refers to a position in a transcript of final assembled text strings assigned to a final assembled text string to identify where the final assembled text string should be placed in relation to other final assembled text strings of the transcript.

The term "temporary format" refers to a display format for a temporary assembled text string that conveys that the string is temporary and therefore still subject to revision. For example, a temporary assembled text string may be displayed using italics.

The term "final format" refers to a display format for a final assembled text string that conveys that the string is final and therefore not subject to further revision. For example, a final assembled text string may be displayed in bold and not italicized to differentiate from the italicized temporary format.

The term "spoken informality" refers to informal words or expressions that are not desirable for inclusion in stored text. For example, a speaker may utter the words "uh" or "um" while delivering a sentence and the transcript recording the speaker should not include those words. Another example of a spoken informality may be an utterance of "uh-huh" to convey agreement, while the transcript recording the speech should include "yes."

The term "voice recognition" refers to programmatically identifying or verifying a person from speech detected in an audio signal.

The term "video signal" refers to an electronic signal for carrying video data.

The term "facial recognition" refers to programmatically identifying or verifying a person from a digital image or a video frame from a video signal.

The term "spoken informality store" refers to a repository of spoken informalities.

The term "machine learning model" refers to a computer application that employs an algorithm to build a model from sample inputs. The machine learning model can make predictions or decisions based on input data.

The terms "programmatically expected," "infer," "inferred," or "inference" indicate machine prediction of occurrence of certain events.

The term "likelihood" refers to a measure of probability for occurrence of a particular event.

The term "speech" refers to spoken language used to communicate.

The term "author" refers to a user or client device that originated or created a digital content object. For example, an author is identified as the user responsible for the creation of a message that was posted to a group-based communication channel.

The term "automatic" or "automatically" refers to any step or steps of an electronic process or processes that takes place without interaction by an outside entity. For example, upon receiving a particular input, a server may automatically transmit a message to a specific client device. Such message will be transmitted by the server without requiring any intermediate input by a user or other device.

The term "electronically notify" refers to an electronic transmission of data indicative of a notification. For example, an electronic notification may comprise a text message, an email, a pop-up notification, or some combination of one or more of text, audio, or video content sufficient to display on a client device a conveyance of a notification.

The term "network time" refers to timestamps defined by a computer, server, or communications network. A timestamp is a sequence of characters or encoded information identifying when a certain event occurred, usually giving date and time of day, sometimes accurate to a small fraction of a second. For example, a digital content object may comprise a timestamp that tells when it was created or last modified.

The term "notification request" refers to a request to receive a notification if a particular name or topic is detected as having been mentioned in a group-based audio/video connection. Accordingly, a notification request is a data structure comprising one or more of a requesting user identifier, a name, a named user identifier (i.e., the user identifier associated with the name for detection and notification), and a topic identifier.

Example System Architecture

Methods, apparatuses, and computer program products of the present disclosure may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 105 via a communications network 104 using client devices 101A-101N. The group-based communication system 105 may comprise a group-based communication server 106 in communication with at least one group-based communication repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

The group-based communication server 106 may be embodied as a computer or computers as known in the art. The group-based communication server 106 may provide for receiving of electronic data from various sources, including but not necessarily limited to the client devices 101A-101N. For example, the group-based communication server 106 may be operable to receive and post or transmit group-based messaging communications provided by the client devices 101A-101N.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of messaging communications organized among a plurality of group-based communication channels, and/or the like.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, a message or messaging communication may be sent from a client device 101A-101N to a group-based communication system 105. In various implementations, the message may be sent to the group-based communication system 105 over communications network 104 directly by a client device 101A-101N, the message may be sent to the group-based communication system 105 via an intermediary such as a message server, and/or the like. For example, the client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit_name          >
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S Build/IMM76D)
AppleWebKit/534.30 (KHTML, like Gecko) Version/4.0 Mobile Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
```

```
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3 Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identifier>
        <channel_identifier>ID_channel_1</channel_identifier>
        <contents>That is an interesting disclosure. I have attached a copy our patent
policy.</contents>
        <attachments>patent_policy.pdf</attachments>
    </message>
</auth_request>
```

The group-based communication system 105 comprises at least one group-based communication server 106 that may create a storage message based upon the received message to facilitate message indexing and storage in a group-based communication repository 107. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 106 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>disclosures</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting disclosure. I have attached a copy
    our patent policy.</contents>
    <attachments>patent_policy.pdf</attachments>
    <conversation_primitive>
        conversation includes messages: ID_message_8,
        ID_message_9, ID_message_10, ID_message_11,
        ID_message_12
    </conversation_primitive>
</storage_message>
```

In embodiments, a group identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PHP commands) to determine a sending user identifier of the user who sent the message.

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
SELECT messageResponses
FROM MSM_Message
WHERE messageID = ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication repository 107). In one implementation, a storage message may be sent from group-based communication server 106 to facilitate indexing in group-based communication repository 107. In another implementation, metadata associated with the message may be determined and the message may be indexed in group-based communication repository 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 107 to facilitate searching. In one embodiment, the files may be indexed such that a company's or a group's files are indexed at a separate distributed repository.

For example, indexing a searchable transcript may comprise indexing of a top recognized transcript (i.e., only the transcript with the highest confidence score) along with a list of the alternatives (i.e., the list of n-best confidence scores that exceed a threshold).

By way of alternative example, all searchable transcripts and alternatives are indexed and associated with their respective corresponding confidence score. The confidence score may be used as part of a search algorithm for providing, ranking, and/or eliminating search results.

Example Apparatus for Implementing Embodiments of the Present Disclosure

The server 106 may be embodied by one or more computing systems, such as apparatus 200 shown in FIG. 2. The apparatus 200 may include a processor 202, a memory 201, input/output circuitry 203, communications circuitry 205, group-based communication repository 107 and group-based communication circuitry 204. The apparatus 200 may be configured to execute the operations dews. Although these components 107 and 201-205 are described with respect to functional limitations, it should be understood that the particular implementations necessarily include the use of particular hardware. It should also be understood that certain of these components 107 and 201-205 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system. The group-based communication circuitry 204 may utilize processing circuitry, such as the processor 202, to perform these actions. The group-based communication circuitry 204 may send and/or receive data from group-based communication repository 107. In some implementations, the sent and/or received data may be of digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Processes for Generating a Searchable Transcript of a Group-based Audio/Video Connection FIGS. 3A and 3B illustrate an exemplary searchable transcript generation method according to one embodiment of the present disclosure. According to embodiments, a group-based audio feed takes place within a group-based communication system. The group-based communication system comprises a group-based communication repository comprising a plurality of digital content objects organized among a plurality of group-based communication channels.

According to embodiments, a method 300 begins with receiving a plurality of audio signals 301 from a plurality of client devices. In some embodiments, each client device of the plurality of client devices is associated with the group-based audio feed. In some embodiments, each client device also comprises an audio-capturing mechanism. Each audio signal comprises a plurality of sequential audio snippets.

In embodiments, the method 300 continues with, for each sequential audio snippet 302, converting the sequential audio snippet to a temporary converted text string 303. In embodiments, a speech recognition engine is used to convert the sequential audio snippet to a temporary converted text string. The method 300 continues with assigning temporary sequence numbers to the temporary converted text string 304.

In embodiments, a plurality of temporary converted text strings is assembled into a temporary assembled text string 305. In embodiments, the plurality of temporary converted text strings is assembled into the temporary assembled texts string according to the temporary sequence number assigned to each temporary converted text string.

In embodiments, the method 300 continues with, for each temporary assembled text string 306, parsing the temporary assembled text string to identify a conversion error 307. The method 300 continues with, based on any identified conversion errors, assigning final sequence numbers to the temporary converted text strings of the temporary assembled text string 308.

In embodiments, the method 300 continues with assembling the plurality of temporary text strings of the temporary assembled text strings into a final assembled text string 309. In embodiments, the temporary text strings are assembled into a final assembled text string according to the final sequence number assigned to each temporary converted text strings.

In embodiments, the method 300 continues with assigning a group-based communication channel identifier, a user identifier, and a group-based audio feed identifier to the final assembled text string 310. In embodiments, the user identifier is associated with the group-based communication channel identifier.

In embodiments, the method continues with storing the final assembled text string in a group-based communication repository 311, where the final assembled text string is associated with a particular searchable transcript identifier. The final assembled text string is also indexed 311 for searching within the group-based communication system.

In embodiments, the final assembled text string is configured for display at a plurality of client devices and transmitted as configured to those plurality of client devices 312.

In some embodiments, the method may optionally assign a connection sequence number to the final assembled text string. The method may continue with optionally assembling the final assembled text string with a plurality of other final assembled text strings into the searchable transcript according to the connection sequence number assigned to each final assembled text string. The method may continue with optionally storing the searchable transcript in the group-based communication repository. The searchable transcript is indexed for searching within the group-based communication system. The searchable transcript is associated with a searchable transcript identifier.

In some embodiments, the method may optionally transmit configured for display, in a group-based communication channel, the temporary assembled text string in a temporary format. Upon assembly of the final assembled text string, the method may optionally transmit configured for display, in the group-based communication channel, the final assembled text string in a final format.

In some embodiments, the method may optionally, for each final assembled text string, parse the final assembled text string to identify an informality, remove the informality from the final assembled text string, and store the final assembled text string in the group-based communication repository. The final assembled text string is indexed for searching within the group-based communication system.

In some embodiments, the method may optionally determine, using voice recognition, the user identifier associated with the audio signal.

In some embodiments, the method may optionally determine, based on a client device associated with the audio signal, the user identifier associated with the audio signal.

In some embodiments, the method may optionally receive a video signal associated with the group-based audio feed and determine, using facial recognition, the user identifier associated with the audio signal.

In some embodiments, the method may optionally identify the spoken informality by comparing the parsed final assembled text string to a spoken informality store. In embodiments, the spoken informality store is generated based on a machine learning model.

In some embodiments, the method may optionally determine, using the speech recognition engine, that the sequential audio snippet does not include speech.

FIGS. 3C and 3D illustrate an exemplary searchable transcript generation method according to one embodiment of the present disclosure. In embodiments, method 310 begins as method 300, with receiving a plurality of audio signals 301. For each sequential audio snippet 302, the sequential audio snippet is converted to a temporary converted text string 303 and a temporary sequence number is assigned 304 to the temporary converted text string.

In embodiments, method 310 includes programmatic detection of a spoken name associated with a user identifier and/or a particular topic associated with the sequential audio snippet. Such detection enables the group-based communication system to transmit electronic notifications to client devices associated with user identifiers having associated therewith a notification request 313. In embodiments, a spoken name associated with a user identifier is detected. In such an embodiment, any notification request associated with the user identifier is retrieved and a notification according to the notification request is transmitted to a client device associated with the user identifier. In embodiments, a topic associated with a user identifier is detected. In such an embodiment, any notification request associated with the user identifier is retrieved and a notification according to the notification request is transmitted to a client device associated with the user identifier.

A notification request can be a request to receive a notification if a particular name is detected as having been mentioned in a group-based audio/video connection. A notification request can be a request to receive a notification if a particular topic is detected as having been discussed in a group-based audio/video connection. Accordingly, a notification request is a data structure comprising one or more of a requesting user identifier, a name, a named user identifier (i.e., the user identifier associated with the name for detection and notification), and a topic identifier. It will be appreciated that the provision of notifications occurs in real-time such that a user who receives a notification may join the group-based audio/video connection while the group-based audio/video connection is still occurring, upon receiving such notification.

Method 310 continues to step 305 and through the rest of method 300 as described above.

For example, a user Jennifer may or may not be aware that a group-based audio/video connection is taking place in a public group-based communication channel. User Jennifer may wish to be notified each time her name is mentioned in any group-based audio/video connection taking place in a public group-based communication channel. In such an example, a notification request includes Jennifer's user identifier, her name (i.e., "Jennifer"), and Jennifer's user identifier (i.e., because she is the named user for which notification is requested). User Jennifer may alternatively wish to be notified each time her manager's name is mentioned in any group-based audio/video connection taking place in a public group-based communication channel. In such an example, a notification request includes Jennifer's user identifier, her manager's name (i.e., "Sarah"), and Sarah's user identifier (i.e., because she is the named user for which notification is requested).

In another example, a user Jennifer may or may not be aware that a group-based audio/video connection is taking place in a public group-based communication channel. User Jennifer may wish to be notified each time a particular topic is discussed in any group-based audio/video connection taking place in a public group-based communication channel. In such an example, a notification request includes Jennifer's user identifier and a topic identifier. Topics are associated with audio snippets according to extracting strings representing one or more of word pairs or tuples, words associated with particular topics, a group of words associated with a particular topic, and truncation of words or phrases associated with particular topics.

Identification of topic associations and other messaging search and management apparatuses and methods for use with embodiments of the present disclosure are disclosed in U.S. patent application Ser. No. 15/604,584, titled "MESSAGING SEARCH AND MANAGEMENT APPARA- TUSES, METHODS AND SYSTEMS," filed May 24, 2017, U.S. patent application Ser. No. 15/604,589, titled "MESSAGING SEARCH AND MANAGEMENT APPARATUSES, METHODS AND SYSTEMS," filed May 24, 2017, and U.S. patent application Ser. No. 15/651,887, titled "MESSAGING SEARCH AND MANAGEMENT APPARATUSES, METHODS AND SYSTEMS," filed Jul. 17, 2017, the contents of which are incorporated herein by reference in their entirety.

In embodiments, one or more summarization algorithms may be applied to a searchable transcript in order to programmatically generate a summary of the contents of the searchable transcript (i.e., the group-based audio/video connection associated with the searchable transcript). In such embodiments, the summary may be indexed and stored in a group-based communication system for future retrieval. In such embodiments, the summary may be selected for inclusion in an electronic digest of group-based communication data. Examples of embodiments of an electronic digest within a group-based communication system for use with embodiments of the present disclosure are disclosed in U.S. Provisional Patent Application Ser. No. 62/703,079, titled "REDUCING TRANSMISSIONS BY SUGGESTING DIGITAL CONTENT FOR DISPLAY IN A GROUP-BASED COMMUNICATION INTERFACE," filed Jul. 25, 2018, the contents of which are incorporated herein by reference in their entirety.

The apparatus is optionally configured to receive a search query from a client device. The apparatus is optionally configured to retrieve from the group-based communication repository, search results comprising a plurality of searchable transcripts based on parameters extracted from the search query. The apparatus is optionally configured to return the search results to the client device. Indexing, retrieval and return/presentation of group-based communication data in search results for use with the present disclosure are disclosed in U.S. patent application Ser. No. 15/844,094, titled "METHOD, APPARATUS AND COMPUTER PROGRAM PRODUCT FOR IMPROVING DATA INDEXING IN A GROUP-BASED COMMUNICATION PLATFORM", filed Dec. 15, 2017 and U.S. patent application Ser. No. 16/010,891, titled "METHOD, APPARATUS, AND COMPUTER PROGRAM PRODUCT FOR METADATA SEARCH IN A GROUP-BASED COMMUNICATION PLATFORM", filed Jun. 18, 2018, the contents of which are incorporated herein by reference in their entirety.

FIG. 4A illustrates an exemplary group-based audio feed according to one embodiment of the present disclosure. According to one embodiment, a group-based audio feed 400 comprises sub-feed1 401, sub-feed2 402, sub-feed3 403, and sub-feed4 404. Each sub-feed is associated with a respective client device. More specifically, subfeed1 401 is associated with client device 1 405, subfeed2 402 is associated with client device 2 406, subfeed3 403 is associated with client device 3 407, and subfeed4 404 is associated with client device 4 408. As shown in FIG. 4A, Jill is a user associated with client device 1 405, Jennifer is a user associated with client device 2 406, Jonathon is a user associated with client device 3 407, and Jason is a user associated with client device 4 408.

In FIG. 4A, sub-feed1 401 comprises a plurality of audio signals 409, 410, and 411 that are captured by an audio capturing mechanism (not shown) of and received from client device 1 405. Sub-feed2 402 comprises a plurality of audio signals 412, 413, 414, and 415 that are captured by an audio capturing mechanism (not shown) of and received from client device 2 406. Sub-feed3 403 comprises a plurality of audio signals 416, 417, and 418 that are captured by an audio capturing mechanism (not shown) of and received from client device 3 407. Sub-feed4 404 comprises a plurality of audio signals 419, 421, and 422 that are captured by an audio capturing mechanism (not shown) of and received from client device 4 408.

In FIG. 4A, audio signal 409 begins at time t1 and has such beginning timestamp of t1 associated therewith. Similarly, audio signal 410 begins at time t7 and audio signal 411 begins at time t9. Audio signal 412 begins at time t3, audio signal 413 begins at time t5, audio signal 414 begins at time t6, and audio signal 415 begins at time t12. Audio signal 416 begins at time t2, audio signal 417 begins at time t4, and audio signal 418 begins at time t8. Finally, audio signal 419 begins at time t3, audio signal 421 begins at time t10, and audio signal 422 begins at time t11. It will be appreciated that times t1-t12 are in sequential order, with t1 being earlier in time than t2, t2 being earlier in time than t3, and so on. It will be appreciated that timestamps t1-12 associated with each audio snippet are used to assign a connection sequence number to a final assembled text string to identify where the final assembled text string should be placed in relation to other final assembled text strings of the group-based audio feed.

FIG. 4B illustrates an exemplary group-based audio feed according to one embodiment of the present disclosure. According to one embodiment, sub-feed1 401 comprises sequential audio snippets 409A, 410A, and 411A. It will be appreciated that sequential audio snippet 409A corresponds to audio signal 409 of FIG. 4A, sequential audio snippet 410A corresponds to audio signal 410 of FIG. 4A, and sequential audio snippet 411A corresponds to audio signal 411 of FIG. 4A.

In FIG. 4B, sub-feed2 402 comprises sequential audio snippets 412A, 413A, 414A, and 415A. It will be appreciated that sequential audio snippet 412A corresponds to audio signal 412 of FIG. 4A, sequential audio snippet 413A corresponds to audio signal 413 of FIG. 4A, sequential audio snippet 414A corresponds to audio signal 414 of FIG. 4A, and sequential audio snippet 415A corresponds to audio signal 415 of FIG. 4A.

In FIG. 4B, sub-feed3 403 comprises sequential audio snippets 416A, 417A, and 418A. It will be appreciated that sequential audio snippet 416A corresponds to audio signal 416 of FIG. 4A, sequential audio snippet 417A corresponds to audio signal 417 of FIG. 4A, and sequential audio snippet 418A corresponds to audio signal 418 of FIG. 4A.

In FIG. 4B, sub-feed4 404 comprises sequential audio snippets 419A, 421A, and 422A. It will be appreciated that sequential audio snippet 419A corresponds to audio signal 419 of FIG. 4A, sequential audio snippet 421A corresponds to audio signal 421 of FIG. 4A, and sequential audio snippet 422A corresponds to audio signal 422 of FIG. 4A.

As an example, sequential audio snippet 409A comprises the text strings "this" "is" and "Jill" arranged in sequential order. FIG. 5 illustrates exemplary assigning of sequence numbers according to one embodiment of the present disclosure. As was shown in FIGS. 4A and 4B, audio signal 409 comprises sequential audio snippet 409A with the text strings "this" "is" and "Jill" arranged in sequential order. In one embodiment, the sequential audio snippet 409A is parsed and the temporary converted text strings "this" "is" and "Jill" are identified and assigned temporary sequence numbers (shown in 505). The temporary converted text strings are arranged according to their temporary sequence numbers into a temporary assembled text string (shown in 506). An error is identified showing that the temporary assembled text string is incorrect. Thereafter, final sequence numbers are assigned to the temporary converted text strings in the sequential audio snippet (shown in 507) and the temporary converted text strings are rearranged according to their final sequence numbers into a final assembled text string (shown in 508).

FIG. 6 illustrates an exemplary group-based audio feed in an exemplary group-based audio interface according to one embodiment of the present disclosure. In one embodiment, a group-based audio interface 600 comprises a channel identifier 601 and a searchable transcript 602 within a group-based communication channel. It will be appreciated that searchable transcript 602 reflects a conversation depicted in FIGS. 4A and 4B for illustrative purposes.

FIG. 7 illustrates an exemplary group-based audio interface according to one embodiment of the present disclosure. In one embodiment, an exemplary group-based audio interface 700 comprises a visual depiction of an option to "start a call" 701 (or initiate a group-based audio feed).

FIG. 8 illustrates an exemplary group-based audio interface according to one embodiment of the present disclosure. In one embodiment, an exemplary group-based audio interface 800 comprises a visual depiction of an option to "start a new call" 801 (or initiate a group-based audio feed).

FIG. 9 illustrates an exemplary group-based audio interface according to one embodiment of the present disclosure. In one embodiment, a group-based audio interface 900 indicates that a group-based audio feed has been initiated.

FIG. 10 illustrates an exemplary group-based audio interface according to one embodiment of the present disclosure. In one embodiment, a group-based audio interface 1000 comprises a transcript of a group-based audio feed. The transcript includes an identification of a speaker 1002 (e.g., a digital photo and a name) and a transcript of what the speaker has said 1001.

FIG. 11 illustrates an exemplary group-based audio interface according to one embodiment of the present disclosure. In one embodiment, a group-based audio interface 1100 comprises a transcript of a group-based audio feed. The transcript includes an identification of a speaker 1102 (e.g., a digital photo and a name) and a transcript of what the speaker has said 1101. Subsequent to the spoken transcript from speaker 1102, the transcript includes an identification of a next speaker 1104 (e.g., a digital photo and a name) and a transcript of what the speaker has said 1103. Subsequent to the spoken transcript from speaker 1104, the transcript includes an identification of a next speaker 1106 (e.g., a digital photo and a name) and a transcript of what the speaker has said 1105.

FIG. 12 illustrates an exemplary group-based audio interface according to one embodiment of the present disclosure. In one embodiment, a searchable transcript of a group-based audio feed can be returned as a search result within a group-based communication system. Group-based audio interface 1200 includes a search mechanism 1201 whereby, in this example, the word "hexadecimal" is searched. Within the search results 1202, a transcript from a group-based audio feed wherein a speaker 1104 spoke the word hexadecimal 1103 is viewable.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for generating a searchable transcript of a group-based audio feed for display within a group-based communication channel interface of a group-based communication system, the group-based communication system comprising a plurality of users organized among a plurality of group-based communication channels, the apparatus comprising at least one processor and at least one memory including computer program code, the at least one memory and the computer program code configured to, with the at least one processor, cause the apparatus to:

receive a group-based audio feed comprised of a plurality of sub-feeds, each sub-feed received from a respective client device, and each sub-feed comprising a plurality of sequential audio snippets, the group-based audio feed associated with a group-based communication channel and a group-based communication connection, wherein the group-based communication channel comprises a communications feed configured to display messaging communications transmitted and viewable by channel members according to access controls associated with the group-based communication channel;

for each sub-feed received from a client device,
for each sequential audio snippet,
using a speech recognition engine, convert the sequential audio snippet to a final assembled text string;
assign a connection sequence number to the final assembled text string; and
assign a group-based communication channel identifier, a user identifier, and a group-based audio feed identifier to the final assembled text string, wherein the user identifier is associated with the group-based communication channel identifier and the group-based communication channel identifier is associated with the group-based communication channel;
transmit, while the group-based communication connection is occurring, to each of the respective client devices, instructions for rendering a group-based communication channel interface comprising the final assembled text strings arranged according to their respective connection sequence number into a real-time transcript that is simultaneously displayed at each of the respective client devices, the group-based communication channel interface associated with the group-based communication channel identifier; and
upon completion of the group-based communication connection, index the real-time transcript into a store the searchable transcript for storage in a group-based communication repository and searching within the group-based communication system.

2. The apparatus of claim 1, wherein the at least one memory and the computer program code are further configured to, with the at least one processor, cause the apparatus to:
transmit to each of the respective client devices a group-based communication channel interface comprising the temporary assembled text strings in a temporary format; and
upon assembly of the final assembled text strings, transmit to each of the respective client devices a group-based communication channel interface comprising the final assembled text strings in a final format.

3. The apparatus of claim 1, wherein the at least one memory and the computer program code are further configured to, with the at least one processor, cause the apparatus to:
for each final assembled text string,
parse the final assembled text string to identify a spoken informality;
remove the spoken informality from the final assembled text string.

4. The apparatus of claim 3, wherein the at least one memory and the computer program code are further configured to, with the at least one processor, cause the apparatus to: identify the spoken informality by comparing the parsed final assembled text string to a spoken informality store.

5. The apparatus of claim 4, wherein the spoken informality store is generated based on a machine learning model.

6. The apparatus of claim 1, wherein the at least one memory and the computer program code are further configured to, with the at least one processor, cause the apparatus to: determine, using voice recognition, the user identifier associated with one of the sub-feed or sequential audio snippet.

7. The apparatus of claim 1, wherein the at least one memory and the computer program code are further configured to, with the at least one processor, cause the apparatus to:
determine, based on a client device associated with the sub-feed, the user identifier associated with the sub-feed.

8. The apparatus of claim 1, wherein each client device comprises a video capturing mechanism, and wherein the at least one memory and the computer program code are further configured to, with the at least one processor, cause the apparatus to:
receive a video signal associated with a sub-feed of the group-based audio feed; and
determine, using facial recognition, the user identifier associated with the sub-feed.

9. The apparatus of claim 1, wherein the at least one memory and the computer program code are further configured to, with the at least one processor, cause the apparatus to: using the speech recognition engine, determine that the sequential audio snippet does not include speech.

10. The apparatus of claim 1, wherein the at least one memory and the computer program code are further configured to, with the at least one processor, cause the apparatus to:
receive a video signal associated with a sub-feed of the group-based audio feed; and
determine, using voice recognition and facial recognition, a user associated with the sub-feed and the video signal.

11. The apparatus of claim 1, wherein the at least one memory and the computer program code are further configured to, with the at least one processor, cause the apparatus to:
detect a spoken name within the group-based audio feed, the spoken name associated with a notification request; and
transmit a notification to a client device associated with a user identifier in the notification request that the spoken name has been detected.

12. The apparatus of claim 1, wherein the at least one memory and the computer program code are further configured to, with the at least one processor, cause the apparatus to:
detect a topic with the group-based audio feed, the topic associated with a notification request; and
transmit a notification to a client device associated with a user identifier in the notification request that the topic has been detected.

13. A system for generating a searchable transcript of a group-based audio feed for display within a group-based communication channel interface of a group-based communication system, the group-based communication system comprising a plurality of users organized among a plurality of group-based communication channels, the system comprising at least one repository and at least one server comprising at least one processor and at least one memory including computer program code, the at least one memory and the computer program code configured to, with the at least one processor, cause the system to:
receive a group-based audio feed comprised of a plurality of sub-feeds, each sub-feed received from a respective client device, and each sub-feed comprising a plurality of sequential audio snippets, the group-based audio feed associated with a group-based communication channel and a group-based communication connection, wherein the group-based communication channel comprises a communications feed configured to display messaging communications transmitted and viewable by channel members according to access controls associated with the group-based communication channel;
for each sub-feed received from a client device,
for each sequential audio snippet,
using a speech recognition engine, convert the sequential audio snippet to a final assembled text string;
assign a connection sequence number to the final assembled text string; and
assign a group-based communication channel identifier, a user identifier, and a group-based audio feed identifier to the final assembled text string, wherein the user identifier is associated with the group-based communication channel identifier and the group-based communication channel identifier is associated with the group-based communication channel;
transmit, while the group-based communication connection is occurring, to each of the respective client devices, instructions for rendering a group-based communication channel interface comprising the final assembled text strings arranged according to their respective connection sequence number into a real-time transcript that is simultaneously displayed at each of the respective client devices, the group-based communication channel interface associated with the group-based communication channel identifier; and
upon completion of the group-based communication connection, index the real-time transcript into a searchable transcript for storage in a group-based communication repository and searching within the group-based communication system.

14. The system of claim 13, wherein the at least one memory and the computer program code are further configured to, with the at least one processor, cause the system to:
for each final assembled text string,
parse the final assembled text string to identify a spoken informality;
remove the spoken informality from the final assembled text string.

15. The system of claim 14, wherein the at least one memory and the computer program code are further configured to, with the at least one processor, cause the system to:
identify the spoken informality by comparing the parsed final assembled text string to a spoken informality store, wherein the spoken informality store is generated based on a machine learning model.

16. The system of claim 13, wherein the at least one memory and the computer program code are further configured to, with the at least one processor, cause the system to:
determine, using voice recognition, the user identifier associated with one of the sub-feed or sequential audio snippet.

17. The system of claim 13, wherein the at least one memory and the computer program code are further configured to, with the at least one processor, cause the system to:
determine, based on a client device associated with the sub-feed, the user identifier associated with the sub-feed.

18. The system of claim 13, wherein each client device comprises a video capturing mechanism, and wherein the at least one memory and the computer program code are further configured to, with the at least one processor, cause the apparatus to:
receive a video signal associated with a sub-feed of the group-based audio feed; and
determine, using facial recognition, the user identifier associated with the sub-feed.

19. The system of claim 13, wherein the at least one memory and the computer program code are further configured to, with the at least one processor, cause the system to:
using the speech recognition engine, determine that the sequential audio snippet does not include speech.

20. The system of claim 13, wherein the at least one memory and the computer program code are further configured to, with the at least one processor, cause the system to:
receive a video signal associated with a sub-feed of the group-based audio feed; and
determine, using voice recognition and facial recognition, a user associated with the sub-feed and the video signal.

21. The system of claim 13, wherein the at least one memory and the computer program code are further configured to, with the at least one processor, cause the system to:
detect a spoken name or a topic within the group-based audio feed, the spoken name or topic associated with a notification request; and
transmit a notification to a client device associated with a user identifier in the notification request that the detection occurred.

22. The system of claim 13, wherein the at least one memory and the computer program code are further configured to, with the at least one processor, cause the system to:
for each sub-feed received from a client device,
for each sequential audio snippet,
using a speech recognition engine, convert the sequential audio snippet to a temporary converted text string;
assign a temporary sequence number to the temporary converted text string;
assemble a plurality of temporary converted text strings into a temporary assembled text string according to the temporary sequence number assigned to each temporary converted text string;
for each temporary assembled text string,
parse the temporary assembled text string to identify a conversion error; and
based on any identified conversion errors, assign final sequence numbers to the temporary converted text strings of the temporary assembled text string;
assemble the plurality of temporary text strings of the temporary assembled text strings into a final assembled text string according to the final sequence number assigned to each temporary converted text strings; and
assign a connection sequence number to the final assembled text string.

23. The system of claim 22, wherein the at least one memory and the computer program code are further configured to, with the at least one processor, cause the system to:
transmit to each of the respective client devices a group-based communication channel interface comprising the temporary assembled text strings in a temporary format; and
upon assembly of the final assembled text strings, transmit to each of the respective client devices a group-based communication channel interface comprising the final assembled text strings in a final format.

24. A computer-implemented method for generating a searchable transcript of a group-based audio feed for outputting to a group-based communication system, the method comprising:
- receiving, by a group-based communication server, a group-based audio feed comprised of a plurality of sub-feeds, each sub-feed received from a respective client device, and each sub-feed comprising a plurality of sequential audio snippets;
- for each sub-feed received from a client device,
- for each sequential audio snippet,
  - using, by the group-based communication server, a speech recognition engine, converting the sequential audio snippet to a temporary converted text string; and
  - assigning, by the group-based communication server, a temporary sequence number to the temporary converted text string;
- assembling, by the group-based communication server, a plurality of temporary converted text strings into a temporary assembled text string according to the temporary sequence number assigned to each temporary converted text string;
- for each temporary assembled text string,
  - parsing, by the group-based communication server, the temporary assembled text string to identify a conversion error; and
  - based on any identified conversion errors, assigning, by the group-based communication server, final sequence numbers to the temporary converted text strings of the temporary assembled text string;
- assembling, by the group-based communication server, the plurality of temporary text strings of the temporary assembled text strings into a final assembled text string according to the final sequence number assigned to each temporary converted text strings;
- assigning, by the group-based communication server, a connection sequence number to the final assembled text string;
- assigning, by the group-based communication server, a group-based communication channel identifier, a user identifier, and a group-based audio feed identifier to the final assembled text string, wherein the user identifier is associated with the group-based communication channel identifier;
- transmitting, by the group-based communication server, to each of the respective client devices, a group-based communication channel interface comprising the final assembled text strings arranged according to their respective connection sequence number into a searchable transcript; and
- storing, by the group-based communication server, the searchable transcript in a group-based communication repository, wherein the searchable transcript is indexed for searching within the group-based communication system.

25. The method of claim 24, further comprising:
- receiving, by the group-based communication server, a search query from a client device;
- retrieving, by the group-based communication server and from the group-based communication repository, search results comprising a plurality of searchable transcripts based on parameters extracted from the search query.

* * * * *